United States Patent
Dang et al.

(10) Patent No.: US 12,105,263 B2
(45) Date of Patent: Oct. 1, 2024

(54) OPTICAL SYSTEM, LENS MODULE, AND ELECTRONIC DEVICE

(71) Applicant: JIANGXI JINGCHAO OPTICAL CO., LTD., Jiangxi (CN)

(72) Inventors: Xuwen Dang, Jiangxi (CN); Binbin Liu, Jiangxi (CN); Hairong Zou, Jiangxi (CN); Ming Li, Jiangxi (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 530 days.

(21) Appl. No.: 17/468,190

(22) Filed: Sep. 7, 2021

(65) Prior Publication Data
US 2021/0405330 A1    Dec. 30, 2021

Related U.S. Application Data

(63) Continuation of application No. PCT/CN2020/080165, filed on Mar. 19, 2020.

(51) Int. Cl.
*G02B 13/00*   (2006.01)
*G02B 9/64*    (2006.01)
*G02B 27/00*   (2006.01)

(52) U.S. Cl.
CPC .......... *G02B 13/0045* (2013.01); *G02B 9/64* (2013.01); *G02B 27/0025* (2013.01)

(58) Field of Classification Search
CPC ... G02B 9/64; G02B 13/0045; G02B 27/0025
See application file for complete search history.

(56) References Cited

U.S. PATENT DOCUMENTS 12,032,126 B2 *   7/2024   Park ................ G02B 13/0045
2015/0103414 A1 * 4/2015   Baik ................ G02B 13/0045
                                                          359/755

(Continued)

FOREIGN PATENT DOCUMENTS

CN   107797244 A   3/2018
CN   107942483 A   4/2018

(Continued)

OTHER PUBLICATIONS

The International Search Report issued in corresponding International Application No. PCT/CN2020/080165, mailed Nov. 27, 2020, pp. 1-11, Beijing, China.

*Primary Examiner* — George G. King
*Assistant Examiner* — Anna Smith
(74) *Attorney, Agent, or Firm* — HAUPTMAN HAM, LLP

(57) ABSTRACT

An optical system, a lens module, and an electronic device are provide. The optical system includes, in order from an object side to an image side along an optical axis, a first to seventh lenses. Each of the first lens, the third lens, and the sixth lens has a positive refractive power. Each of the second lens and the seventh lens has a negative refractive power. Each of the second lens, the third lens, and the sixth lens has an object-side surface which is convex near the optical axis. Each of the second lens and the seventh lens has an image-side surface which is concave near the oprtical axis. The third lens has an image-side surface which is convex near a periphery of the image-side surface of the third lens. The seventh lens has an object-side surface which is convex near the optical axis.

18 Claims, 14 Drawing Sheets

(56) References Cited

U.S. PATENT DOCUMENTS

2019/0079270 A1* 3/2019 Tseng ................. G02B 13/18
2019/0121090 A1* 4/2019 Shi ................. G02B 13/0045
2019/0384041 A1   12/2019 Huang
2020/0003995 A1* 1/2020 Jung ................. G02B 9/64

FOREIGN PATENT DOCUMENTS

CN    109283655 A    1/2019
CN    110058380 A    7/2019
CN    110568596 A   12/2019

* cited by examiner

OPTICAL SYSTEM, LENS MODULE, AND ELECTRONIC DEVICE

CROSS-REFERENCE TO RELATED APPLICATIONS

The present application is a continuation of International Application No. PCT/CN2020/080165, filed on Mar. 19, 2020, the disclosure of which is hereby incorporated by reference in its entirety.

TECHNICAL FIELD

The present disclosure relates to the field of optical imaging technology, and particularly to an optical system, a lens module, and an electronic device.

BACKGROUND

With the development of science and technology and the popularization of smart electronic devices such as smart phones, devices with diversified camera functions, especially wide-angle cameras, are widely favored by people. The current wide-angle is mostly an ordinary wide-angle of less than 84°, and the size of the object space that it shoots is very different from the viewing angle of the human eye, which limits its daily use scenes. Under the condition of limited shooting distance, the size of an object space that can be accommodated by a wide-angle of more than 100o is about 1.6 times that of a wide-angle of 84°. At the same time, with the addition of high pixels and high image quality, the wide-angle of more than 100° can support more scenes for daily use. In addition, a wide-angle lens with a large imaging area can allow more image cropping during shooting and obtain better video shooting stability. Therefore, a higher-quality wide-angle lens is needed to meet the development trend of high-pixel ultra-thin optical lens sets.

SUMMARY

According to the present application, an optical system, a lens module, and an electronic device are provided, so as to solve the above-mentioned problems.

Technical solutions are provided blow to achieve at least one objective of the present disclosure.

In a first aspect, an optical system is provided. The optical system includes, in order from an object side to an image side along an optical axis, a first lens with a positive refractive power, a second lens with a negative refractive power, a third lens with a positive refractive power, a fourth lens with a refractive power, a fifth lens with a refractive power, a sixth lens with a positive refractive power, and a seventh lens with a negative refractive power. The first lens has an object-side surface and an image-side surface which are both aspherical. The second lens has an object-side surface which is convex near the optical axis, and an image-side surface which is concave near the optical axis. The third lens has an object-side surface which is convex near the optical axis, and an image-side surface which is convex near a periphery of the image-side surface of the third lens. The fourth lens has an object-side surface and an image-side surface which are both aspherical. The fifth lens has an object-side surface and an image-side surface which are both aspherical. At least one of the object-side surface and the image-side surface of the fifth lens has at least one inflection point. The sixth lens has an object-side surface which is convex near the optical axis. Both the object-side surface and an image-side surface of the sixth lens are aspherical, and at least one of the object-side surface and the image-side surface of the sixth lens has at least one inflection point. The seventh lens has an object-side surface which is convex near the optical axis, and an image-side surface which is concave near the optical axis.

Both the object-side surface and the image-side surface of the seventh lens are aspherical, and at least one of the object-side surface and the image-side surface of the seventh lens has at least one inflection point.

The optical system has a structure of seven-element lenses, a refractive power and a surface shape of each lens of the first to seventh optical lenses are reasonably configured, so that the optical system meets the requirements of high resolution, large angle of view, and miniaturization.

In an implementation, the optical system satisfies the following expression: $101.0 \leq FOV \leq 105.0$, where FOV represents the maximum angle of view of the optical system. As an example, the FOV is greater than 90°, so that the optical system is applicable to more usage scenarios.

In an implementation, the optical system satisfies the following expression: $1.10 < TTL/ImgH < 1.45$, where TTL represents a distance from the object-side surface of the first lens to an image plane on the optical axis, ImgH represents half of a diagonal length of an effective imaging region on the image plane. A size of an electronic photosensitive chip depends on ImgH. A greater value of ImgH leads to a greater size of the maximum electronic photosensitive chip and higher pixel counts. A reduction in TTL allows the length of the overoll optical system to be shortened, which is beneficial to achieving ultra-thin and miniaturization. On condition that the above expression is satisfied, it allows the optical system to support an electronic photosensitive chip with high pixel counts and have a shorten length, such that a small-sized optical system accommodates a large-size photosensitive chip.

In an implementation, the optical system satisfies the following expression: $19.00 < FOV/TTL \leq 25.00$, where TTL represents a distance from an object-side surface of the first lens to an image plane on the optical axis. The FOV of the optical system in this implementation has greater than 100°. Thus, the optical system in this implementation is a wide-angle lens and can capture wider fields of view at the same imaging distance. When being applied to an electronic device such as a smart phone, the optical system allows the electronic device to be applicable in more usage scenarios. On condition that the above expression is satisfied, it allows a lens group with a small size to have a large field of view.

In an implementation, the optical system satisfies the following expression: $|HDIS/f| < 1.45$, where HDIS represents a value of TV distortion in a horizontal direction of the optical system, f represents an effective focal length of the optical system. TV distortion is a measure of visual distortion of an image, and serves as an important indicator for evaluating the imaging quality of the optical system. The value of TV distortion is expressed in terms of percent (%). When the FOV of the optical system is greater than 100°, the imaging is prone to a large distortion. However, on condition that the above expression is satisfied, the overall distortion is compressed and controlled within an appropriate range through adopting the aspheric surface(s) appropriately, thereby ensuring the image quality under a large field of view.

In an implementation, the optical system satisfies the following expression: $5.00 < (|f4|+|f5|)/f < 423.00$, where f4 represents an effective focal length of the fourth lens, f5 represents an effective focal length of the fifth lens, and f represents an effective focal length of the optical system. The fifth lens has a refractive power (i.e., a positive refractive power or a negative refractive power) which serves as a part to adjust the refractive power of the overall optical system. The combination of the fourth lens and the fifth lens decreases an incidence angle of light on the lens under a large field of view, which is beneficial to lowering the tolerance sensitivity of the optical system. At the same time, the combination can significantly reduce the primary aberration of a front lens group which is composed of several lenses close to the object side of the optical system, and a reasonable refractive power configuration can achieve higher image quality.

In an implementation, the optical system satisfies the following expression: |SAG71/R72|<0.50, where SAG71 represents the maximum sagittal height of the object-side surface of the seventh lens in an axis direction of the seventh lens, R72 represents a radius of curvature of the image-side surface of the seventh lens on the optical axis. The seventh lens includes at least one inflection point on the object side and the image side which, together with the change in the maximum sagittal height in an axial direction perpendicular to the optical axis, allows the refractive power distribution in a vertical direction to be appropriate, a distortion and a curvature of field generated by the front lens group, which is composed of several lenses close to the object side, to be eliminated to the greatest extent, and the image quality to be improved.

In an implementation, the optical system satisfies the following expression: 1.60<(CT1+CT2+CT3)/BFL<2.90, where CT1 represents a thickness of the first lens on the optical axis, CT2 represents a thickness of the second lens on the optical axis, CT3 represents a thickness of the third lens on the optical axis, and BFL represents a minimum distance from the image-side surface of the seventh lens to an image plane in a direction parallel to the optical axis. An appropriate back focus length ensures the matching of the lens group and the electronic photosensitive chip. The combination of the positive refractive power, the negative refractive powe, and the positive refractive power of the first three lenses (i.e., the first lens, the second lens, and the third lens) achieves a good effect of eliminating chromatic aberration and spherical aberration. On condition that the above expression is satisfied, it allows each of the first lens, the second lens, and the third lens to have an appropriate thickness on the optical axis, thereby effectively improving the compactness of the lens structure, reducing the length of the optical system, and facilitating lens molding and assembly.

In an implementation, the optical system satisfies the following expression: 0.30<(SAG52+SAG61)/(ET5+CT6) <1.20, where SAG52 represents the maximum sagittal height of the image-side surface of the fifth lens in an axis direction of the image-side surface of the fifth lens, SAG61 represents the maximum sagittal height of the object-side surface of the sixth lens in an axis direction of the object-side surface of the sixth lens, ET5 represents a thickness of the fifth lens at the maximum optical clear aperture of the fifth lens, and CT6 represents a thickness of the sixth lens on the optical axis. On condition that the above expression is satisfied, the change in the sagittal height of an aspheric surface of each of the fifth lens and the sixth lens is beneficial to correcting the aberrations generated by the optical system under a large field of view and improving the image quality. In addition, aspheric surfaces of the lenses cooperate to reduce a deflection angle of the light, which is beneficial to reducing the sensitivity. Appropriate centre thickness (i.e., thickness on the optical axis) and edge thickness (i.e., thickness on the periphery) can reduce the length of the overall optical system and the difficulty of molding.

In an implementation, the optical system satisfies the following expression: (f3+|f41|)/(R31+|R41|)<12.00, where f3 represents an effective focal length of the third lens, f4 represents an effective focal length of the fourth lens, R31 represents a radius of curvature of the object-side surface of the third lens on the optical axis, and R41 represents a radius of curvature of the object-side surface of the fourth lens on the optical axis. On condition that the above expression is satisfied, each of the third lens and the fourth lens will not have an excessive radius of curvature. At the same time, primary aberrations introduced by the third lens and the fourth lens will be small, which is beneficial to correcting an aberration of the overall optical system via subsequent aspheric lenses. An appropriate distribution in refractive powers and radius of curvatures of the third lens and the fourth lens is beneficial to reducing the difficulty of molding and assembly.

In a second aspect, a lens module is further provided. The lens module includes the optical system of any of the implementations in the first aspect. The optical system provided in the present disclosure is disposed in the lens module, such that the lens module has the advantages of large angle of view, high resolution, and miniaturization.

In a third aspect, an electronic device is provided. The electronic device includes a housing and the lens module of the second aspect, where the lens module is received in the housing. The lens module provided in the present disclosure is disposed in the electronic device, such that the electronic device has the advantages of high resolution, large angle of view, and miniaturization.

BRIEF DESCRIPTION OF THE DRAWINGS

To describe the technical solutions in the implementations of the present disclosure or the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

FIG. 1b illustrates a longitudinal spherical aberration curve, an astigmatic field curve, and a distortion curve of the optical system of FIG. 1a.

FIG. 2b illustrates a longitudinal spherical aberration curve, an astigmatic field curve, and a distortion curve of the optical system of FIG. 2a.

FIG. 3b illustrates a longitudinal spherical aberration curve, an astigmatic field curve, and a distortion curve of the optical system of FIG. 3a.

FIG. 4b illustrates a longitudinal spherical aberration curve, an astigmatic field curve, and a distortion curve of the optical system of FIG. 4a.

FIG. 5b illustrates a longitudinal spherical aberration curve, an astigmatic field curve, and a distortion curve of the optical system of FIG. 5a.

FIG. 6b illustrates a longitudinal spherical aberration curve, an astigmatic field curve, and a distortion curve of the optical system of FIG. 6a.

FIG. 7b illustrates a longitudinal spherical aberration curve, an astigmatic field curve, and a distortion curve of the optical system of FIG. 7a.

DETAILED DESCRIPTION OF ILLUSTRATED IMPLEMENTATIONS

Figure 1A:
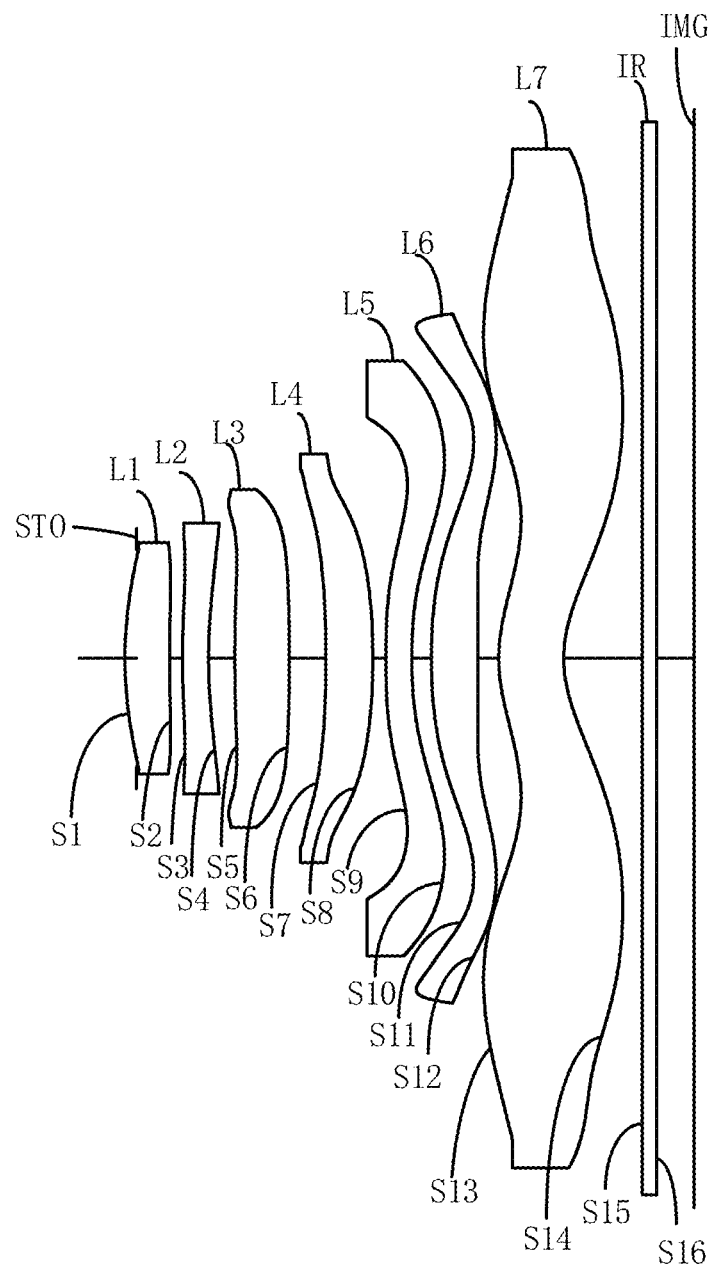
FIG. 1a is a schematic structural view of an optical system according to an implementation.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

A lens module is provided. The lens module includes a lens barrel and an optical system provided in implementations of the disclosure. The first to seventh lenses of the optical system are received in the lens barrel. The lens module can be an independent lens of a digital camera or an imaging module integrated on an electronic device such as a smart phone. The optical system provided by the present disclosure is disposed in the lens module, such that the lens module has the advantages of large angle of view, high resolution, and miniaturization.

An electronic device is provided. The electronic device includes a housing and the lens module in the implementations of the present disclosure. The electronic device further includes an electronic photosensitive element. The lens module and the electronic photosensitive element are received in the housing. The electronic photosensitive element has a photosensitive surface which is disposed on an image plane of the optical system and configured to convert light passing through the first to seventh lenses and incident on the electronic photosensitive element into an electrical signal of an image. The electronic photosensitive element may be a complementary metal oxide semiconductor (CMOS) or a charge-coupled device (CCD). The electronic device can be a smart phone, a personal digital assistant (PDA), a tablet computer, a smart watch, a drone, an e-book reader, a driving recorder, a wearable device, etc. The lens module provided in the present disclosure is disposed in the electronic device, such that the electronic device has the advantages of high resolution, large angle of view, and miniaturization.

According to the implementations of the present disclosure, an optical system is provided. The optical system includes, in order from an object side to an image side along an optical axis, a first lens, a second lens, a third lens, a fourth lens, a fifth lens, a sixth lens, and a seventh lens. In the first to seventh lenses, there is an air gap between any two adjacent lenses.

Shapes and structures of the seven-element lenses are described as follows. The first lens has a positive refractive power. The first lens has an object-side surface and an image-side surface which are both aspherical. The second lens has a negative refractive power. The second lens has an object-side surface which is convex near the optical axis, and an image-side surface which is concave near the optical axis. The third lens has a positive refractive power. The third lens has an object-side surface which is convex near the optical axis, and an image-side surface which is convex near a periphery of the image-side surface of the third lens. The fourth lens has a refractive power. The fourth lens has an object-side surface and an image-side surface which are both aspherical. The fifth lens has a refractive power. The fifth lens has an object-side surface and an image-side surface which are both aspherical. At least one of the object-side surface and the image-side surface of the fifth lens has at least one inflection point. The sixth lens has a positive refractive power. The sixth lens has an object-side surface which is convex near the optical axis. Both the object-side surface and an image-side surface of the sixth lens are aspherical, and at least one of the object-side surface and the image-side surface of the sixth lens has at least one inflection point. The seventh lens has a negative refractive power. The seventh lens has an object-side surface which is convex near the optical axis, and an image-side surface which is concave near the optical axis. Both the object-side surface and the image-side surface of the seventh lens are aspherical, and at least one of the object-side surface and the image-side surface of the seventh lens has at least one inflection point.

The optical system further includes a stop, which can be arranged at any position between the first lens and the seventh lens. For example, the stop can be disposed to a side of the object-side surface of the first lens.

The optical system has a structure of seven-element lenses, a refractive power and a surface shape of each lens of the first to seventh optical lenses are reasonably configured, so that the optical system meets the requirements of high resolution, large angle of view, and miniaturization.

An infrared cut-off filter can also be disposed between the seventh lens and the image plane to pass through the visible light waveband and cut off the infrared light waveband, so as to avoid false colors or ripples due to interference of non-operating waveband light waves, and improve effective resolution and color reproduction.

In an implementation, the optical system satisfies the following expression: $101.0 \leq FOV \leq 105.0$, where FOV represents the maximum angle of view of the optical system. As an example, the FOV is greater than 90°, so that the optical system is applicable to more usage scenarios.

In an implementation, the optical system satisfies the following expression: $1.10 < TTL/ImgH < 1.45$, where TTL represents a distance from the object-side surface of the first lens to an image plane on the optical axis, ImgH represents half of a diagonal length of an effective imaging region on the image plane. A size of an electronic photosensitive chip depends on ImgH.

A greater value of ImgH leads to a greater size of the maximum electronic photosensitive chip and higher pixel counts. A reduction in TTL allows the length of the overoll optical system to be shortened, which is beneficial to achieving ultra-thin and miniaturization. On condition that the above expression is satisfied, it allows the optical system to support an electronic photosensitive chip with high pixel counts and have a shorten length, such that a small-sized optical system accommodates a large-size photosensitive chip.

In an implementation, the optical system satisfies the following expression: 19.00<FOV/TTL≤25.00, where TTL represents a distance from an object-side surface of the first lens to an image plane on the optical axis. The FOV of the optical system in this implementation is greater than 100°. Thus, the optical system in this implementation has a wide-angle lens and can capture wider fields of view at the same imaging distance. When being applied to an electronic device such as a smart phone, the optical system allows the electronic device to be applicable in more usage scenarios. On condition that the above expression is satisfied, it allows a lens group with a small size to have a large field of view.

In an implementation, the optical system satisfies the following expression: |HDIS/f|<1.45, where HDIS represents a value of TV distortion in a horizontal direction of the optical system, f represents an effective focal length of the optical system. TV distortion is a measure of visual distortion of an image, and serves as an important indicator for evaluating the imaging quality of the optical system. The value of TV distortion is expressed in terms of percent (%).

When the FOV of the optical system is greater than 100°, the imaging is prone to a large distortion. However, on condition that the above expression is satisfied, the overall distortion is compressed and controlled within an appropriate range through adopting the aspheric surface(s) appropriately, thereby ensuring the image quality under a large field of view.

In an implementation, the optical system satisfies the following expression: 5.00<(|f4|+|f5|)/f<423.00, where f4 represents an effective focal length of the fourth lens, f5 represents an effective focal length of the fifth lens, and f represents an effective focal length of the optical system. The fifth lens has a refractive power (i.e., a positive refractive power or a negative refractive power) which serves as a part to adjust the refractive power of the overall optical system. The combination of the fourth lens and the fifth lens decreases an incidence angle of light on the lens under a large field of view, which is beneficial to lowering the tolerance sensitivity of the optical system. At the same time, the combination can significantly reduce the primary aberration of a front lens group which is composed of several lenses close to the object side of the optical system, and a reasonable refractive power configuration can achieve higher image quality.

In an implementation, the optical system satisfies the following expression: |SAG71/R72|<0.50, where SAG71 represents the maximum sagittal height of the object-side surface of the seventh lens in an axis direction of the seventh lens, R72 represents a radius of curvature of the image-side surface of the seventh lens on the optical axis. The seventh lens includes at least one inflection point on the object side and the image side which, together with the change in the maximum sagittal height in an axial direction perpendicular to the optical axis, allows the refractive power distribution in a vertical direction to be appropriate, a distortion and a curvature of field generated by the front lens group, which is composed of several lenses close to the object side, to be eliminated to the greatest extent, and the image quality to be improved.

In an implementation, the optical system satisfies the following expression: 1.60<(CT1+CT2+CT3)/BFL<2.90, where CT1 represents a thickness of the first lens on the optical axis, CT2 represents a thickness of the second lens on the optical axis, CT3 represents a thickness of the third lens on the optical axis, and BFL represents a minimum distance from the image-side surface of the seventh lens to an image plane in a direction parallel to the optical axis.

An appropriate back focus length ensures the matching of the lens group and the electronic photosensitive chip. The combination of the positive refractive power, the negative refractive powe, and the positive refractive power of the first three lenses (i.e., the first lens, the second lens, and the third lens) achieves a good effect of eliminating chromatic aberration and spherical aberration. On condition that the above expression is satisfied, it allows each of the first lens, the second lens, and the third lens to have an appropriate thickness on the optical axis, thereby effectively improving the compactness of the lens structure, reducing the length of the optical system, and facilitating lens molding and assembly.

In an implementation, the optical system satisfies the following expression: 0.30<(SAG52+SAG61)/(ET5+CT6)<1.20, where SAG52 represents the maximum sagittal height of the image-side surface of the fifth lens in an axis direction of the image-side surface of the fifth lens, SAG61 represents the maximum sagittal height of the object-side surface of the sixth lens in an axis direction of the object-side surface of the sixth lens, ET5 represents a thickness of the fifth lens at the maximum optical clear aperture of the fifth lens, and CT6 represents a thickness of the sixth lens on the optical axis. On condition that the above expression is satisfied, the change in the sagittal height of an aspheric surface of each of the fifth lens and the sixth lens is beneficial to correcting the aberrations generated by the optical system under a large field of view and improving the image quality. In addition, aspheric surfaces of the lenses cooperate to reduce a deflection angle of the light, which is beneficial to reducing the sensitivity. Appropriate centre thickness (i.e., thickness on the optical axis) and edge thickness (i.e., thickness on the periphery) can reduce the length of the overall optical system and the difficulty of molding.

In an implementation, the optical system satisfies the following expression: (f3+|f41|)/(R31+|R41|)<12.00, where f3 represents an effective focal length of the third lens, f4 represents an effective focal length of the fourth lens, R31 represents a radius of curvature of the object-side surface of the third lens on the optical axis, and R41 represents a radius of curvature of the object-side surface of the fourth lens on the optical axis. On condition that the above expression is satisfied, each of the third lens and the fourth lens will not have an excessive radius of curvature. At the same time, primary aberrations introduced by the third lens and the fourth lens will be small, which is beneficial to correcting an aberration of the overall optical system via subsequent aspheric lenses. An appropriate distribution in refractive powers and radius of curvatures of the third lens and the fourth lens is beneficial to reducing the difficulty of molding and assembly.

Figure 1B:
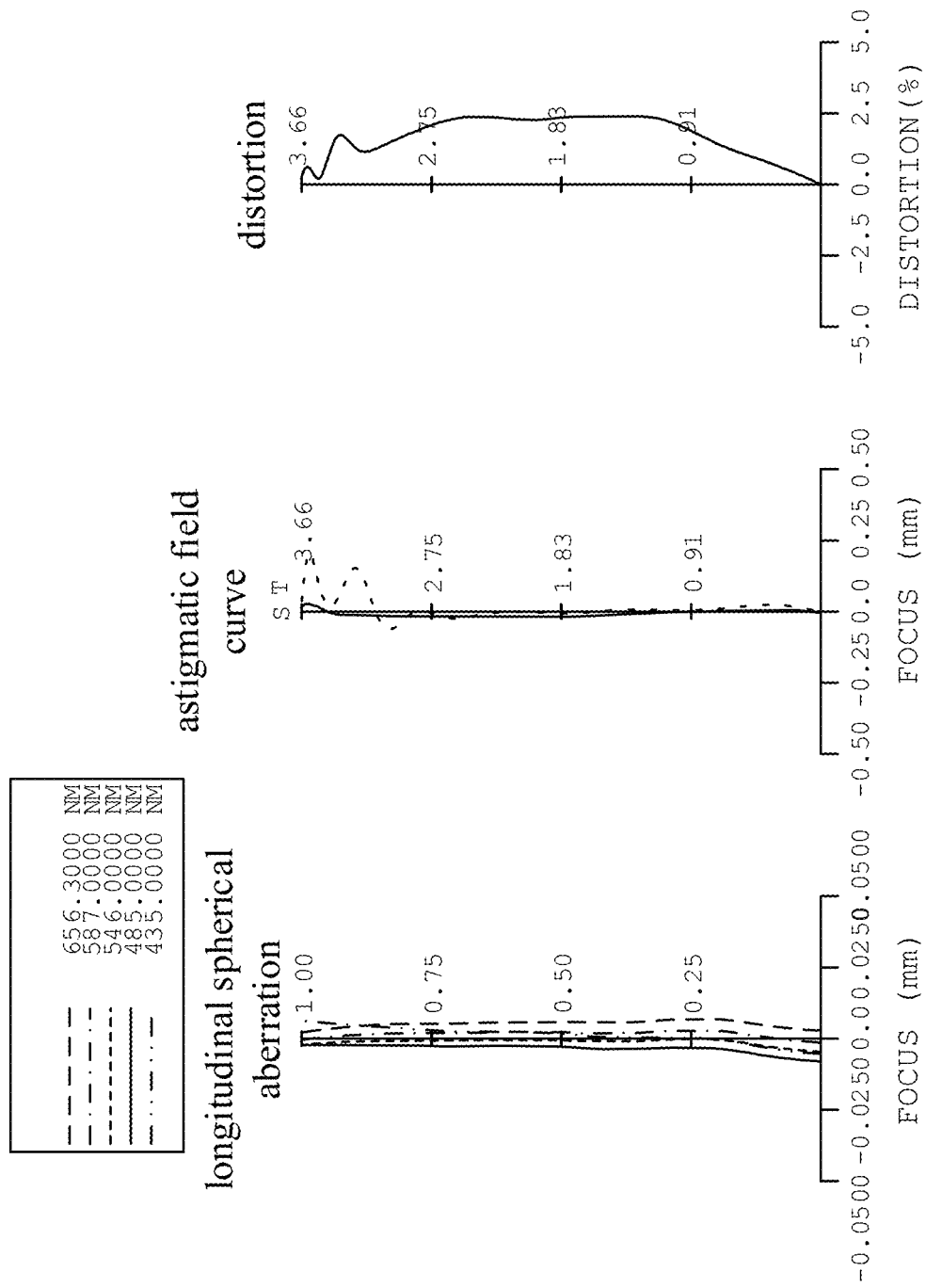

Referring to FIG. 1a and FIG. 1b, the optical system in this implementation includes, in order from the object side to the image side along the optical axis, the first lens L1, the second lens L2, the third lens L3, the fourth lens L4, the fifth lens L5, the sixth lens L6, and the seventh lens L7.

The first lens L1 has a positive refractive power. The object-side surface S1 of the first lens L1 is convex near the optical axis and is convex near a periphery of the object-side surface S1 of the first lens L1. The image-side surface S2 of the first lens L1 is concave near the optical axis and is convex near a periphery of the image-side surface S2 of the first lens L1.

The second lens L2 has a negative refractive power. The object-side surface S3 of the second lens L2 is convex near the optical axis and is concave near a periphery of the object-side surface S3. The image-side surface S4 of the second lens L2 is concave near the optical axis and is concave near a periphery of the image-side surface S4 of the second lens L2.

The third lens L3 has a positive refractive power. The object-side surface S5 of the third lens L3 is convex near the optical axis and is convex near a periphery of the object-side surface of the third lens L3. The image-side surface S6 of the third lens L3 is convex near the optical axis and is convex near a periphery of the image-side surface S6 of the third lens L3.

The fourth lens L4 has a positive refractive power. The object-side surface S7 of the fourth lens L4 is concave near the optical axis and is concave near a periphery of the object-side surface S7 of the fourth lens L4. The image-side surface S8 of the fourth lens L4 is convex near the optical axis and is convex near a periphery of the image-side surface S8 of the fourth lens L4.

The fifth lens L5 has a negative refractive power. The object-side surface S9 of the fifth lens L5 is convex near the optical axis and is convex near a periphery of the object-side surface S9 of the fifth lens L5. The image-side surface S10 of the fifth lens L5 is concave near the optical axis and is concave near a periphery of the image-side surface S10 of the fifth lens L5.

The sixth lens L6 has a positive refractive power. At least one of the object-side surface S11 and the image-side surface S12 of the sixth lens L6 has at least one inflection point. The object-side surface S11 of the sixth lens L6 is convex near the optical axis and is convex near a periphery of the object-side surface S11 of the sixth lens L6. The image-side surface S12 of the sixth lens L6 is concave near the optical axis and is convex near a periphery of image-side surface S12 of the sixth lens L6.

The seventh lens L7 has a negative refractive power. At least one of the object-side surface S13 and the image-side surface S14 of the seventh lens L7 has at least one inflection point. The object-side surface S13 of the seventh lens L7 is convex near the optical axis and is concave near a periphery of the object-side surface S13 of the seventh lens L7. The image-side surface S14 of the seventh lens L7 is concave near the optical axis and is convex near a periphery of image-side surface S14 of the seventh lens L7.

In an implementation, each lens of the first to seventh lenses (L1 to L7) is made of plastic.

In addition, the optical system further includes a stop ST0, an infrared cut-off filter IR, and an image plane MG. The stop ST0 is disposed to a side of the object-side surface S1 of the first lens L1, for controlling the amount of light entering. In other implementations, the stop ST0 can also be disposed between two adjacent lenses or on one of the other lenses. The infrared cut-off filter IR is disposed between the image-side surface S14 and the image plane MG. The infrared cut-off filter IR has the object-side surface S15 and the image-side surface S16 and is used to filter out infrared light so that the light entering the image plane IMG is visible light, and the wavelength of visible light is 380 nm-780 nm. The infrared cut-off filter IR is made of glass and can be coated thereon. An effective pixel region of the electronic photosensitive element is disposed on the image plane IMG.

Table 1a illustrates characteristics of the optical system in this implementation. Each data in Table 1 a is obtained based on the visible light with a wavelength of 546 nm. Each of Y radius, thickness, and focal length is in units of millimeter (mm).

TABLE 1a

Optical system of FIG. 1a
f = 2.89 , FNO = 2.0, FOV = 101.0, TTL = 4.38

| Surface Number Object number | Surface Name | Shape Spherical | Y Radius Infinity | Thickness Infinity | Material | Refractive Index | Abbe Number | Focal length |
|---|---|---|---|---|---|---|---|---|
| ST0 | Stop | Spherical | Infinity | −0.087 | | | | |
| S1 | First | Aspherical | 2.388 | 0.343 | Plastic | 1.545 | 55.912 | 5.519 |
| S2 | lens | Aspherical | 10.901 | 0.100 | | | | |
| S3 | Second | Aspherical | 5.094 | 0.200 | Plastic | 1.661 | 20.412 | −12.104 |
| S4 | lens | Aspherical | 3.076 | 0.202 | | | | |
| S5 | Third | Aspherical | 8.184 | 0.420 | Plastic | 1.545 | 55.912 | 9.700 |
| S6 | lens | Aspherical | −14.770 | 0.281 | | | | |
| S7 | Fourth | Aspherical | −12.698 | 0.363 | Plastic | 1.545 | 55.912 | 11.954 |
| S8 | lens | Aspherical | −4.357 | 0.100 | | | | |
| S9 | Fifth | Aspherical | 7.365 | 0.200 | Plastic | 1.661 | 20.412 | −9.002 |
| S10 | lens | Aspherical | 3.275 | 0.150 | | | | |
| S11 | Sixth | Aspherical | 3.137 | 0.359 | Plastic | 1.545 | 55.912 | 6.206 |
| S12 | lens | Aspherical | 40.240 | 0.160 | | | | |
| S13 | Seventh | Spherical | 0.933 | 0.501 | Plastic | 1.545 | 55.912 | −42.282 |
| S14 | lens | Spherical | 0.726 | 0.605 | | | | |
| S15 | Infrared | Spherical | Infinity | 0.110 | Glass | 1.517 | 64.167 | |
| S16 | cut-off filter IR | Spherical | Infinity | 0.290 | | | | |
| IMG | Image plane | Spherical | Infinity | 0.000 | | | | |

Note:
The reference wavelength is 546 nm f represents an effective focal length of the optical system. FNO represents F-number of the optical system. FOV represents the maximum angle of view of the optical system. TTL represents a distance from the object-side surface S1 of the first lens L1 to the image plane IMG on the optical axis.

In this implementation, the object-side surface and the image-side surface of each of the first to seventh lenses (L1, L2, L3, L4, L5, L6, L7) are aspherical. A surface shape of each aspherical lens can be defined by but not limited to the following aspherical formula:

$$x = \frac{ch^2}{1+\sqrt{1-(k+1)c^2h^2}} + \sum A_i h^i$$

x represents a distance (sag) along the optical axis from a vertex of the aspherical surface to a position on the aspherical surface at a height h. c represents the paraxial curvature of the aspherical surface, and is the inverse of the Y radius (that is, c=1/R, where R represents the Y radius in the Table 1a). k represents the conic coefficient. Ai represents the i-th order correction coefficient of the aspherical surface. Table 1b shows higher-order coefficients A4, A6, A8, A10, A12, A14, A16, A18, and A20 of each of aspherical lens surfaces S1 to S14 in the optical system of FIG. 1a.

TABLE 1b

Optical system of FIG. 1a
Aspherical coefficients

| Surface Number | S1 | S2 | S3 | S4 | S5 | S6 | S7 |
|---|---|---|---|---|---|---|---|
| K | −4.9801E+00 | −9.9000E+01 | −5.9754E+01 | −4.2731E+00 | −7.3937E+01 | 9.9000E+01 | 9.8632E+01 |
| A4 | 3.3662E−03 | −1.0283E−01 | −1.3624E−01 | −1.1817E−01 | −1.4662E−02 | −5.3080E−02 | −2.8582E−01 |
| A6 | 4.4137E−01 | 1.5900E−01 | 1.6235E−01 | 1.2717E−01 | −9.4211E−02 | 1.6910E−01 | 9.1873E−01 |
| A8 | −4.9322E+00 | −6.5336E−01 | −3.3921E−01 | 5.2196E−02 | −1.7936E−02 | −7.2841E−01 | −2.0229E+00 |
| A10 | 3.0392E+01 | 2.5895E+00 | 2.1178E+00 | −4.5628E−01 | 6.8418E−01 | 1.6524E+00 | 3.1746E+00 |
| A12 | −1.1476E+02 | −7.4252E+00 | −9.0346E+00 | 7.5077E−01 | −2.7961E+00 | −2.9348E+00 | −3.7672E+00 |
| A14 | 2.6705E+02 | 9.7097E+00 | 1.8405E+01 | −1.5212E+00 | 5.9221E+00 | 3.8006E+00 | 3.1507E+00 |
| A16 | −3.7245E+02 | 3.4263E−01 | −1.8216E+01 | 2.8663E+00 | −7.4173E+00 | −3.2396E+00 | −1.6703E+00 |
| A18 | 2.8382E+02 | −1.3754E+01 | 6.9514E+00 | −2.7808E+00 | 4.9374E+00 | 1.5629E+00 | 5.0013E−01 |
| A20 | −9.0301E+01 | 9.7655E+00 | 1.4660E−01 | 1.0466E+00 | −1.2965E+00 | −3.1847E−01 | −6.5037E−02 |

| | S8 | S9 | S10 | S11 | S12 | S13 | S14 |
|---|---|---|---|---|---|---|---|
| K | 7.5630E+00 | 3.5739E+00 | −2.2951E+01 | −1.0421E+01 | 8.6837E+01 | −4.8106E+00 | −2.3526E+00 |
| A4 | −2.3226E−01 | 3.9857E−01 | 4.4487E−01 | 1.3762E−01 | −2.1823E−01 | −1.8504E−01 | −1.9958E−01 |
| A6 | 9.1114E−01 | −6.6913E−01 | −8.7478E−01 | −7.8856E−02 | 7.6219E−01 | 1.4944E−02 | 1.0364E−01 |
| A8 | −2.3534E+00 | 5.7296E−01 | 1.0126E+00 | 7.4286E−02 | −8.5322E−01 | 2.3315E−02 | −3.8126E−02 |
| A10 | 3.5489E+00 | −2.4595E−01 | −7.8248E−01 | −1.1659E−01 | 5.0154E−01 | −9.4401E−03 | 1.0103E−02 |
| A12 | −3.3096E+00 | −1.9534E−02 | 3.9106E−01 | 8.8577E−02 | −1.7707E−01 | 1.7361E−03 | −1.8629E−03 |
| A14 | 1.8249E+00 | 6.3155E−02 | −1.2354E−01 | −3.5597E−02 | 38728E−02 | −1.7915E−04 | 2.2699E−04 |
| A16 | −5.0805E−01 | −2.1313E−02 | 2.3751E−02 | 7.9313E−03 | −5.1285E−03 | 1.0496E−05 | −1.7131E−05 |
| A18 | 3.9484E−02 | 1.6664E−03 | −2.5352E−03 | −9.2750E−04 | 3.7625E−04 | −3.1691E−07 | 7.1923E−07 |
| A20 | 5.6601E−03 | 1.7922E−04 | 1.1526E−04 | 4.4450E−05 | −1.1728E−05 | 3.5912E−09 | −1.2793E−08 |

FIG. 1b illustrates a longitudinal spherical aberration curve, an astigmatic field curve, and a distortion curve of the optical system of FIG. 1a. The longitudinal spherical aberration curve represents a focus deviation of each of light rays with different wavelengths after passing through each lens of the optical system. The astigmatic field curve represents tangential field curvature and sagittal field curvature. The distortion curve represents magnitudes of distortions corresponding to different field angles. As illustrated in FIG. 1b, the optical system of FIG. 1a can achieve good imaging quality.

Figure 2A:
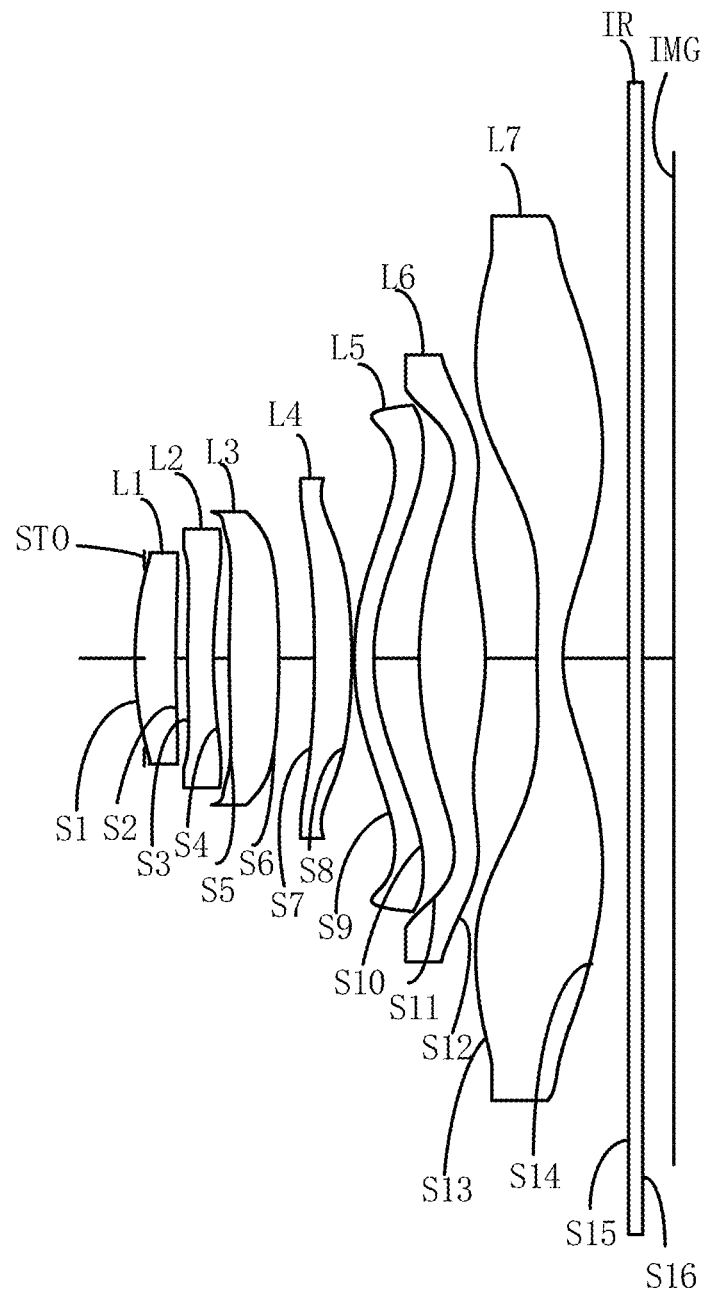
FIG. 2a is a schematic structural view of an optical system according to an implementation.
Figure 2B:
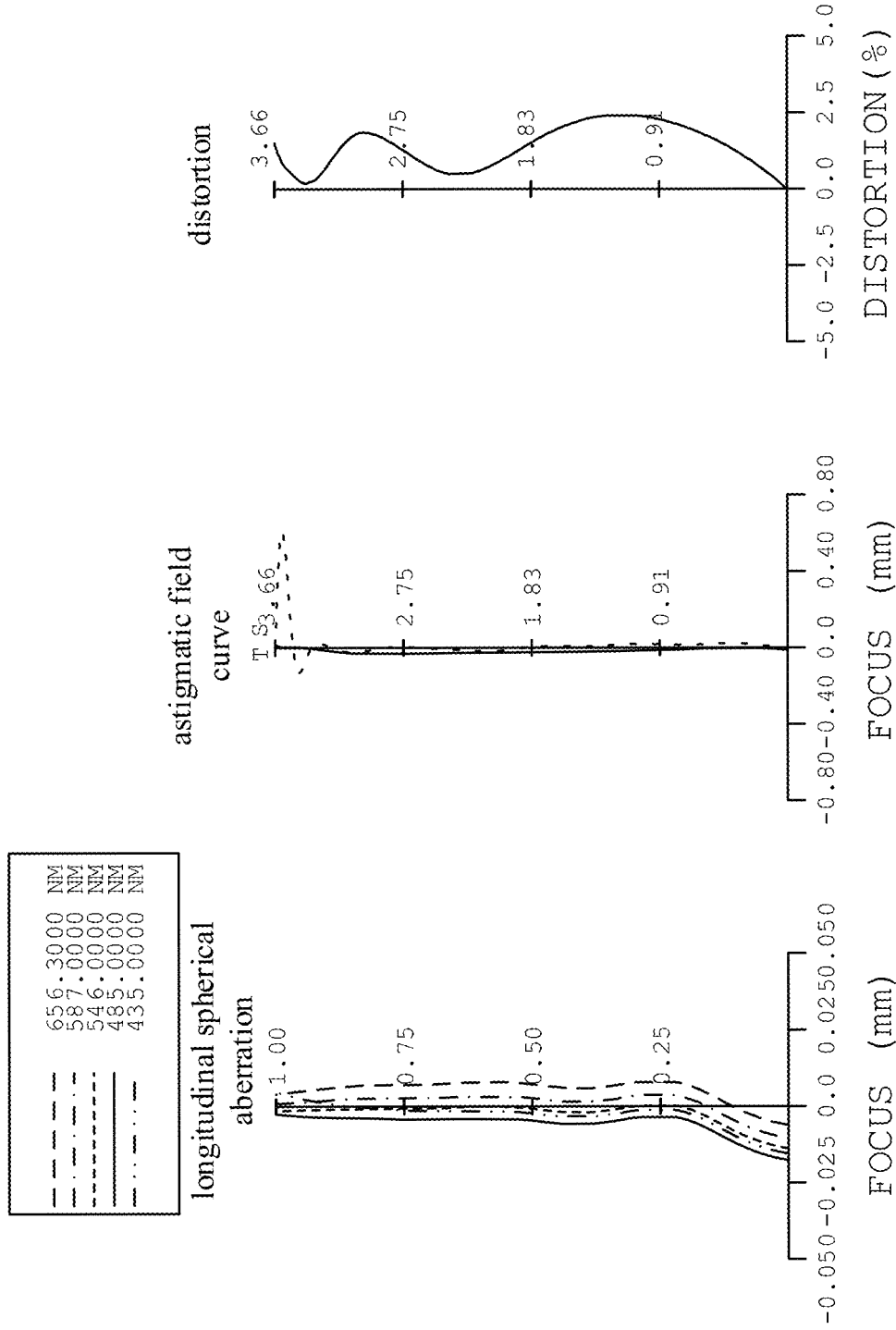

Referring to FIG. 2a and FIG. 2b, the optical system in this implementation includes, in order from the object side to the image side along the optical axis, the first lens L1, the second lens L2, the third lens L3, the fourth lens L4, the fifth lens L5, the sixth lens L6, and the seventh lens L7.

The first lens L1 has a positive refractive power. The object-side surface S1 of the first lens L1 is convex near the optical axis and is concave near a periphery of the object-side surface S1 of the first lens L1. The image-side surface S2 of the first lens L1 is concave near the optical axis and is concave near a periphery of the image-side surface S2 of the first lens L1.

The second lens L2 has a negative refractive power. The object-side surface S3 of the second lens L2 is convex near the optical axis and is concave near a periphery of the object-side surface S3 of the second lens L2. The image-side surface S4 of the second lens L2 is concave near the optical axis and is convex near a periphery of the image-side surface S4 of the second lens L2.

The third lens L3 has a positive refractive power. The object-side surface S5 of the third lens L3 is convex near the optical axis and is concave near a periphery of the object-side surface S5 of the third lens L3. The image-side surface S6 of the third lens L3 is convex near the optical axis and is convex near a periphery of the image-side surface S6 of the third lens L3.

The fourth lens L4 has a positive refractive power. The object-side surface S7 of the fourth lens L4 is concave near the optical axis and is concave near a periphery of the object-side surface S7 of the fourth lens L4. The image-side surface S8 of the fourth lens L4 is convex near the optical axis and is concave near a periphery of the image-side surface S8 of the fourth lens L4.

The fifth lens L5 has a negative refractive power. The object-side surface S9 of the fifth lens L5 is convex near the optical axis and is concave near a periphery of the object-side surface S9 of the fifth lens L5. The image-side surface S10 of the fifth lens L5 is concave near the optical axis and is convex near a periphery of the image-side surface S10 of the fifth lens L5.

The sixth lens L6 has a positive refractive power. At least one of the object-side surface S11 and the image-side surface S12 of the sixth lens L6 has at least one inflection point. The object-side surface S11 of the sixth lens L6 is convex near the optical axis and is concave near a periphery of the object-side surface S11 of the sixth lens L6. The image-side surface S12 of the sixth lens L6 is convex near the optical axis and is convex near a periphery of image-side surface S12 of the sixth lens L6.

The seventh lens L7 has a negative refractive power. At least one of the object-side surface S13 and the image-side surface S14 of the seventh lens L7 has at least one inflection point. The object-side surface S13 of the seventh lens L7 is convex near the optical axis and is convex near a periphery of the object-side surface S13 of the seventh lens L7. The image-side surface S14 of the seventh lens L7 is concave near the optical axis and is convex near a periphery of image-side surface S14 of the seventh lens L7.

The other structures of the optical system of FIG. 2a are identical with the optical system of FIG. Ta, reference can be made to the optical system of FIG. Ta.

Table 2a illustrates characteristics of the optical system in this implementation. Each data in Table 2a is obtained based on the visible light with a wavelength of 546 nm. Each of Y radius, thickness, and focal length is in units of millimeter (mm).

TABLE 2a

Optical system of FIG. 2a
f = 2.73 , FNO = 2.1, FOV = 104.0, TTL = 4.16

| Surface Number Object number | Surface Name | Shape Spherical | Y Radius Infinity | Thickness Infinity | Material | Refractive Index | Abbe Number | Focal length |
|---|---|---|---|---|---|---|---|---|
| ST0 | Stop | Spherical | Infinity | −0.070 | | | | |
| S1 | First | Aspherical | 2.407 | 0.316 | Plastic | 1.545 | 55.912 | 6.130 |
| S2 | lens | Aspherical | 8.153 | 0.090 | | | | |
| S3 | Second | Aspherical | 5.741 | 0.200 | Plastic | 1.661 | 20.412 | −9.605 |
| S4 | lens | Aspherical | 2.988 | 0.122 | | | | |
| S5 | Third | Aspherical | 10.569 | 0.383 | Plastic | 1.545 | 55.912 | 8.374 |
| S6 | lens | Aspherical | −7.970 | 0.274 | | | | |
| S7 | Fourth | Aspherical | −52.340 | 0.290 | Plastic | 1.545 | 55.912 | 10.878 |
| S8 | lens | Aspherical | −5.349 | 0.020 | | | | |
| S9 | Fifth | Aspherical | 1.907 | 0.150 | Plastic | 1.661 | 20.412 | −10.983 |
| S10 | lens | Aspherical | 1.466 | 0.350 | | | | |
| S11 | Sixth | Aspherical | 2.329 | 0.512 | Plastic | 1.545 | 55.912 | 2.1070 |
| S12 | lens | Aspherical | −2.100 | 0.400 | | | | |
| S13 | Seventh | Aspherical | 6.166 | 0.200 | Plastic | 1.545 | 55.912 | −2.3120 |
| S14 | lens | Aspherical | 1.036 | 0.506 | | | | |
| S15 | Infrared | Spherical | Infinity | 0.110 | Glass | 1.517 | 64.167 | |
| S16 | cut-off filter IR | Spherical | Infinity | 0.241 | | | | |
| IMG | Image plane | Spherical | Infinity | 0.000 | | | | |

Note:
The reference wavelength is 546 nm

Each parameter in Table 2a represents the same meaning as that in the optical system of FIG. T a.

Table 2b shows higher-order coefficients that can be used for each aspherical lens surface in the optical system of FIG. 2a, where a shape of each aspherical lens surface can be defined by the formula given in the optical system of FIG. Ta.

TABLE 2b

Optical system of FIG. 2a
Aspherical coefficients

| Surface Number | S1 | S2 | S3 | S4 | S5 | S6 | S7 |
|---|---|---|---|---|---|---|---|
| K | −2.1142E+00 | −8.3947E+01 | −9.9000E+01 | −1.1234E+01 | 4.0593E+01 | 3.7876E+01 | −9.9000E+01 |
| A4 | −5.3385E−02 | −1.2002E−01 | −2.1980E−01 | −1.3346E−01 | −1.4858E−02 | −4.3073E−02 | −3.9061E−01 |
| A6 | 1.7988E+00 | 1.9878E−01 | 7.7212E−01 | 1.7189E−01 | 1.3434E−02 | 2.7517E−01 | 1.3711E+00 |
| A8 | −2.4752E+01 | −9.8137E−01 | −6.5879E+00 | −5.5702E−02 | −1.3315E+00 | −1.4333E+00 | −2.9017E+00 |
| A10 | 2.0079E+02 | 9.4857E+00 | 4.5669E+01 | −5.6905E−01 | 7.5958E+00 | 3.6786E+00 | 3.4930E+00 |
| A12 | −9.9596E+02 | −5.9890E+01 | −1.9943E+02 | −1.7591E−01 | −2.3919E+01 | −6.3222E+00 | −2.2605E+00 |
| A14 | 3.0568E+03 | 2.1411E+02 | 5.3160E+02 | 3.1532E+00 | 4.5013E+01 | 7.1428E+00 | 5.3707E−01 |
| A16 | −5.6581E+03 | −4.4116E+02 | −8.4800E+02 | −6.4395E+00 | −5.1286E+01 | −5.1969E+00 | −2.0520E−01 |
| A18 | −5.7798E+03 | 4.8145E+02 | 7.3853E+02 | 5.8079E+00 | 3.2403E+01 | 2.1407E+00 | −1.5024E−01 |
| A20 | −2.4983E+03 | −2.1291E+02 | −2.6840E+02 | −1.9791E+00 | −8.5773E+00 | −3.5303E−01 | −2.4556E−02 |

| | S8 | S9 | S10 | S11 | S12 | S13 | S14 |
|---|---|---|---|---|---|---|---|
| K | −1.9464E+00 | −1.0559E+01 | −1.2562E+01 | −1.6293E+01 | −3.5383E+01 | −1.7376E+00 | −2.2332E+00 |
| A4 | −2.7308E−01 | 3.0533E−01 | 3.5051E−01 | −6.2214E−02 | −1.9847E−01 | −2.4114E−01 | −2.5580E−01 |
| A6 | −8.2369E−01 | −6.1926E−01 | −6.8301E−01 | 3.5223E−01 | 5.9497E−01 | 9.8344E−02 | 1.6557E−01 |
| A8 | −1.9290E+00 | 6.9857E−01 | 6.9433E−01 | −5.4199E−01 | −6.4024E−01 | −2.4704E−02 | −7.0608E−02 |

TABLE 2b-continued

Optical system of FIG. 2a
Aspherical coefficients

| Surface Number | | | | | | | |
|---|---|---|---|---|---|---|---|
| A10 | −2.9359E+00 | −5.3262E−01 | −4.0179E−01 | 4.6768E−01 | 4.0688E−01 | 7.0340E−03 | 1.9677E−02 |
| A12 | −3.2132E+00 | 3.0638E−01 | 1.2213E−01 | −2.5976E−01 | −1.7004E−01 | −1.9443E−03 | −3.5676E−03 |
| A14 | −2.5262E+00 | −1.4407E−01 | −1.2680E−02 | 9.3481E−02 | 4.6244E−02 | 3.5859E−04 | 4.1612E−04 |
| A16 | −1.2768E+00 | −5.0111E−02 | −2.6404E−03 | −2.1150E−02 | −7.7659E−03 | −3.8945E−05 | −3.0125E−05 |
| A18 | −3.6028E−01 | −1.0404E−02 | 8.3333E−04 | 2.7377E−03 | 7.2624E−04 | 2.2752E−06 | 1.2354E−06 |
| A20 | −4.2888E−02 | −9.1928E−04 | −6.3387E−05 | −1.5394E−04 | −2.8839E−05 | −5.5449E−08 | −2.2027E−08 |

FIG. 2b illustrates a longitudinal spherical aberration curve, an astigmatic field curve, and a distortion curve of the optical system of FIG. 2a. In this implementation, the longitudinal spherical aberration curve represents deviations of focus points of lights of different wavelengths after passing through the lenses of the optical system. The astigmatic field curve represents a tangential field curvature and a sagittal field curvature. The distortion curve represents distortion values corresponding to different angles of view. As illustrated in FIG. 2b, the optical system of FIG. 2a can achieve good imaging quality.

Figure 3A:
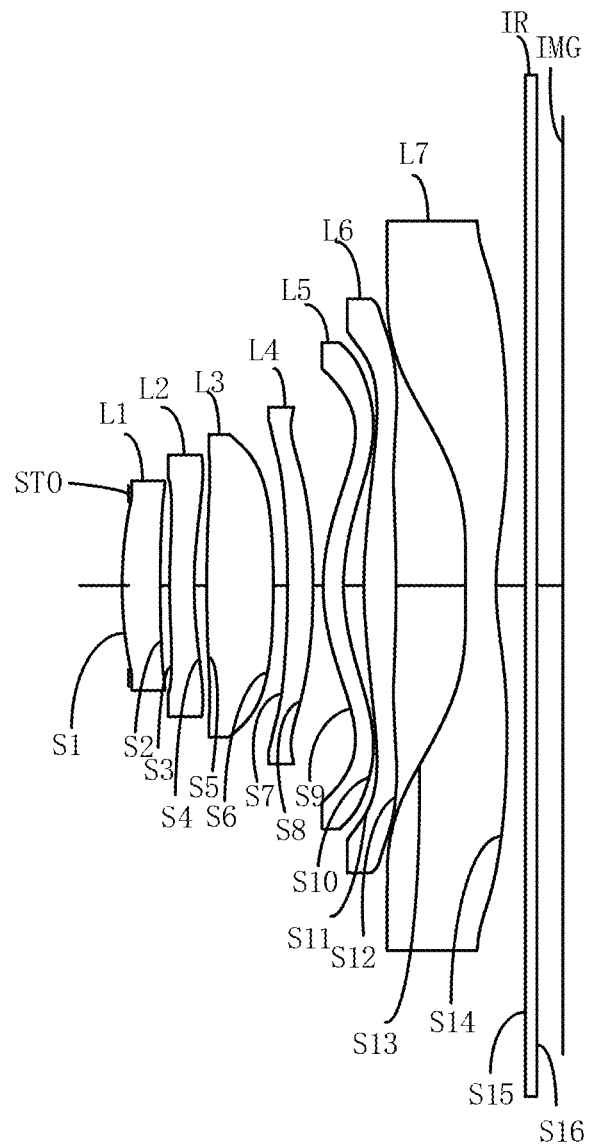
FIG. 3a is a schematic structural view of an optical system according to an implementation.
Figure 3B:
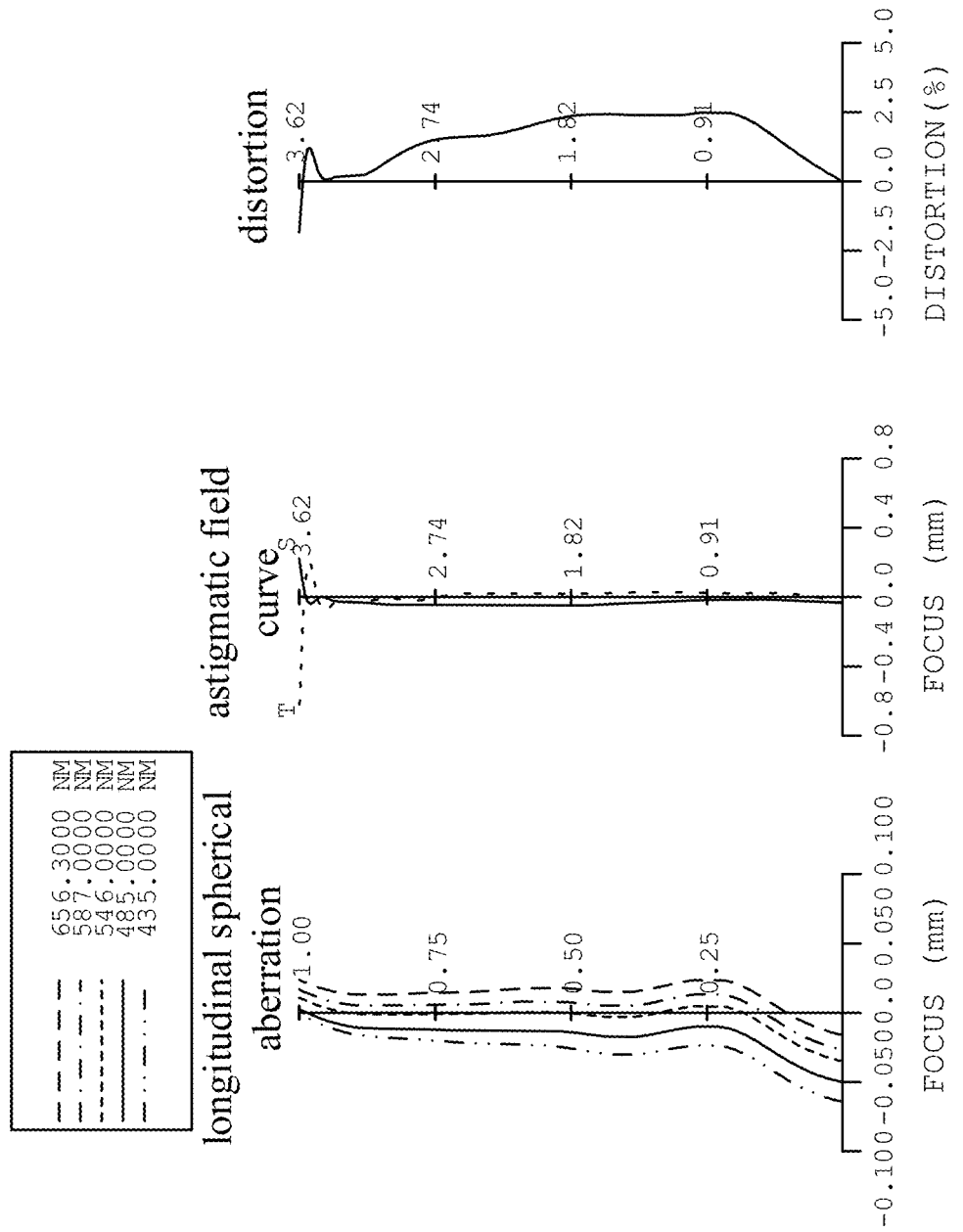

Referring to FIG. 3a and FIG. 3b, the optical system in this implementation includes, in order from the object side to the image side along the optical axis, the first lens L1, the second lens L2, the third lens L3, the fourth lens L4, the fifth lens L5, the sixth lens L6, and the seventh lens L7.

The first lens L1 has a positive refractive power. The object-side surface S1 of the first lens L1 is convex near the optical axis and is convex near a periphery of the object-side surface S1 of the first lens L1. The image-side surface S2 of the first lens L1 is concave near the optical axis and is convex near a periphery of the image-side surface S2 of the first lens L1.

The second lens L2 has a negative refractive power. The object-side surface S3 of the second lens L2 is convex near the optical axis and is concave near a periphery of the object-side surface S3 of the second lens L2. The image-side surface S4 of the second lens L2 is concave near the optical axis and is concave near a periphery of the image-side surface S4 of the second lens L2.

The third lens L3 has a positive refractive power. The object-side surface S5 of the third lens L3 is convex near the optical axis and is concave near a periphery of the object-side surface S5 of the third lens L3. The image-side surface S6 of the third lens L3 is convex near the optical axis and is convex near a periphery of the image-side surface S6 of the third lens L3.

The fourth lens L4 has a positive refractive power. The object-side surface S7 of the fourth lens L4 is concave near the optical axis and is concave near a periphery of the object-side surface S7 of the fourth lens L4. The image-side surface S8 of the fourth lens L4 is convex near the optical axis and is concave near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is concave near the optical axis and is convex near a periphery of the image-side surface S10 of the fifth lens L5.

The sixth lens L6 has a positive refractive power. At least one of the object-side surface S11 and the image-side surface S12 of the sixth lens L6 has at least one inflection point. The object-side surface S11 of the sixth lens L6 is convex near the optical axis and is concave near a periphery of the object-side surface S11 of the sixth lens L6. The image-side surface S12 of the sixth lens L6 is convex near the optical axis and is convex near a periphery of image-side surface 512 of the sixth lens L6.

The seventh lens L7 has a negative refractive power. At least one of the object-side surface S13 and the image-side surface 514 of the seventh lens L7 has at least one inflection point. The object-side surface 513 of the seventh lens L7 is convex near the optical axis and is concave near a periphery of the object-side surface 513 of the seventh lens L7. The image-side surface 514 of the seventh lens L7 is concave near the optical axis and is convex near a periphery of image-side surface 514 of the seventh lens L7.

The other structures of the optical system in FIG. 3a are identical with the optical system of FIG. 1a, reference can be made to the optical system of FIG. 1a.

Table 3a illustrates characteristics of the optical system in this implementation. Each data in Table 3a is obtained based on the visible light with a wavelength of 546 nm. Each of Y radius, thickness, and focal length is in units of millimeter (mm).

TABLE 3a

Optical system of FIG. 3a
f = 2.76 , FNO = 2.1, FOV = 103.0, TTL = 4.33

| Surface Number Object number | Surface Name | Shape Spherical | Y Radius Infinity | Thickness Infinity | Material | Refractive Index | Abbe Number | Focal length |
|---|---|---|---|---|---|---|---|---|
| ST0 | Stop | Spherical | Infinity | −0.065 | | | | |
| S1 | First | Aspherical | 2.667 | 0.372 | Plastic | 1.545 | 55.912 | 7.190 |
| S2 | lens | Aspherical | 7.889 | 0.094 | | | | |
| S3 | Second | Aspherical | 4.304 | 0.241 | Plastic | 1.661 | 20.412 | −9.947 |
| S4 | lens | Aspherical | 2.554 | 0.122 | | | | |
| S5 | Third | Aspherical | 8.411 | 0.654 | Plastic | 1.545 | 55.912 | 7.867 |

TABLE 3a-continued

Optical system of FIG. 3a
f = 2.76 , FNO = 2.1, FOV = 103.0, TTL = 4.33

| Surface Number Object number | Surface Name | Shape Spherical | Y Radius Infinity | Thickness Infinity | Material | Refractive Index | Abbe Number | Focal length |
|---|---|---|---|---|---|---|---|---|
| S6 | lens | Aspherical | −8.553 | 0.140 | | | | |
| S7 | Fourth | Aspherical | −13.251 | 0.250 | Plastic | 1.545 | 55.912 | 17.815 |
| S8 | lens | Aspherical | −5.650 | 0.100 | | | | |
| S9 | Fifth | Aspherical | 1.271 | 0.200 | Plastic | 1.661 | 20.412 | 20.895 |
| S10 | lens | Aspherical | 1.310 | 0.200 | | | | |
| S11 | Sixth | Aspherical | 2.747 | 0.316 | Plastic | 1.545 | 55.912 | 4.061 |
| S12 | lens | Aspherical | −11.079 | 0.680 | | | | |
| S13 | Seventh | Aspherical | 10.820 | 0.300 | Plastic | 1.545 | 55.912 | −3.835 |
| S14 | lens | Aspherical | 1.738 | 0.290 | | | | |
| S15 | Infrared | Spherical | Infinity | 0.110 | Glass | 1.517 | 64.167 | |
| S16 | cut-off filter IR | Spherical | Infinity | 0.257 | | | | |
| IMG | Image plane | Spherical | Infinity | 0.000 | | | | |

Note:
The reference wavelength is 546 nm

Each parameter in Table 3a represents the same meaning as that in the optical system of FIG. T a.

Table 3b shows higher-order coefficients that can be used for each aspherical lens surface in the optical system of FIG. 3a, where a shape of each aspherical lens surface can be defined by the formula given in the optical system of FIG. Ta.

TABLE 3b

Optical system of FIG. 3a
Aspherical coefficients

| Surface Number | S1 | S2 | S3 | S4 | S5 | S6 | S7 |
|---|---|---|---|---|---|---|---|
| K | −6.6766E−01 | 8.5638E+01 | −7.9061E+01 | −1.1615E+01 | 5.4241E+01 | 3.8752E+01 | 5.0544E+01 |
| A4 | −1.2185E−01 | −1.2455E−02 | −1.5074E−01 | −1.1894E−01 | −7.1864E−02 | −2.4983E−01 | −4.0179E−01 |
| A6 | 4.1921E+00 | −9.0256E−01 | 1.7201E+00 | 7.4443E−01 | 3.3071E−01 | 5.1391E−01 | 1.6969E+00 |
| A8 | −6.3724E+01 | 1.0860E+01 | −1.9980E+01 | −4.0128E+00 | −1.4957E+00 | −4.5838E−01 | −3.6903E+00 |
| A10 | 5.5305E+02 | −7.0457E+01 | 1.2518E+02 | 1.3050E+01 | 4.8530E+00 | −1.1982E+00 | 4.6127E+00 |
| A12 | −2.8981E+03 | 2.7353E+02 | −4.7526E+02 | −2.6949E+01 | −1.0982E+01 | 3.9292E+00 | −3.4993E+00 |
| A14 | 9.3474E+03 | −6.3998E+02 | 1.1216E+03 | 3.5549E+01 | 1.6010E+01 | −5.2477E+00 | 1.5579E+00 |
| A16 | −1.8157E+04 | 8.7261E+02 | −1.6077E+03 | −2.9245E+01 | −1.4315E+01 | 3.8262E+00 | −3.6433E−01 |
| A18 | 1.9492E+04 | −6.2665E+02 | 1.2795E+03 | 1.3695E+01 | 7.1011E+00 | −1.5025E+00 | 3.8171E−02 |
| A20 | −8.8862E+03 | 1.7774E+02 | −4.3300E+02 | −2.7838E+00 | −1.4852E+00 | 2.5162E−01 | −2.6883E−03 |

| | S8 | S9 | S10 | S11 | S12 | S13 | S14 |
|---|---|---|---|---|---|---|---|
| K | −7.5432E+00 | −1.0165E+01 | −1.1893E+01 | −5.0521E+01 | −2.3358E+01 | −2.3917E−01 | −2.1927E+00 |
| A4 | −3.3209E−01 | 3.4378E−01 | 3.0699E−01 | −2.7790E−01 | −6.1982E−02 | −4.6273E−01 | −2.9589E−01 |
| A6 | 1.1808E+00 | −6.2179E−01 | −5.4075E−01 | 1.5946E−01 | 1.9700E−01 | 3.7354E−01 | 2.0009E−01 |
| A8 | −2.5955E+00 | 6.5251E−01 | 4.9679E−01 | −3.3717E−01 | −1.7915E−01 | −1.9605E−01 | −8.0352E−02 |
| A10 | 3.4046E+00 | −5.0796E−01 | −3.2143E−01 | 3.7553E−01 | 9.3477E−02 | 6.6404E−02 | 2.0430E−02 |
| A12 | −2.8289E+00 | 2.7911E−01 | 1.4689E−01 | −2.4853E−01 | −3.4856E−02 | −1.2383E−02 | −3.3864E−03 |
| A14 | 1.5132E+00 | −1.0796E−01 | −4.7419E−02 | 9.9951E−02 | 9.7898E−03 | 7.2807E−04 | 3.7257E−04 |
| A16 | −4.9669E−01 | 2.8331E−02 | 1.0614E−02 | −2.3934E−02 | −1.9176E−03 | 1.3759E−04 | −2.7511E−05 |
| A18 | 8.9615E−02 | −4.4708E−03 | −1.4832E−03 | 3.1301E−03 | 2.2247E−04 | −2.5917E−05 | 1.3130E−06 |
| A20 | −6.7736E−03 | 3.1379E−04 | 9.4951E−05 | −1.7166E−04 | −1.1152E−05 | 1.2674E−06 | −3.1479E−08 |

FIG. 3b illustrates a longitudinal spherical aberration curve, an astigmatic field curve, and a distortion curve of the optical system of FIG. 3a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 3b, the optical system of the FIG. 3a can achieve good imaging quality.

Figure 4A:
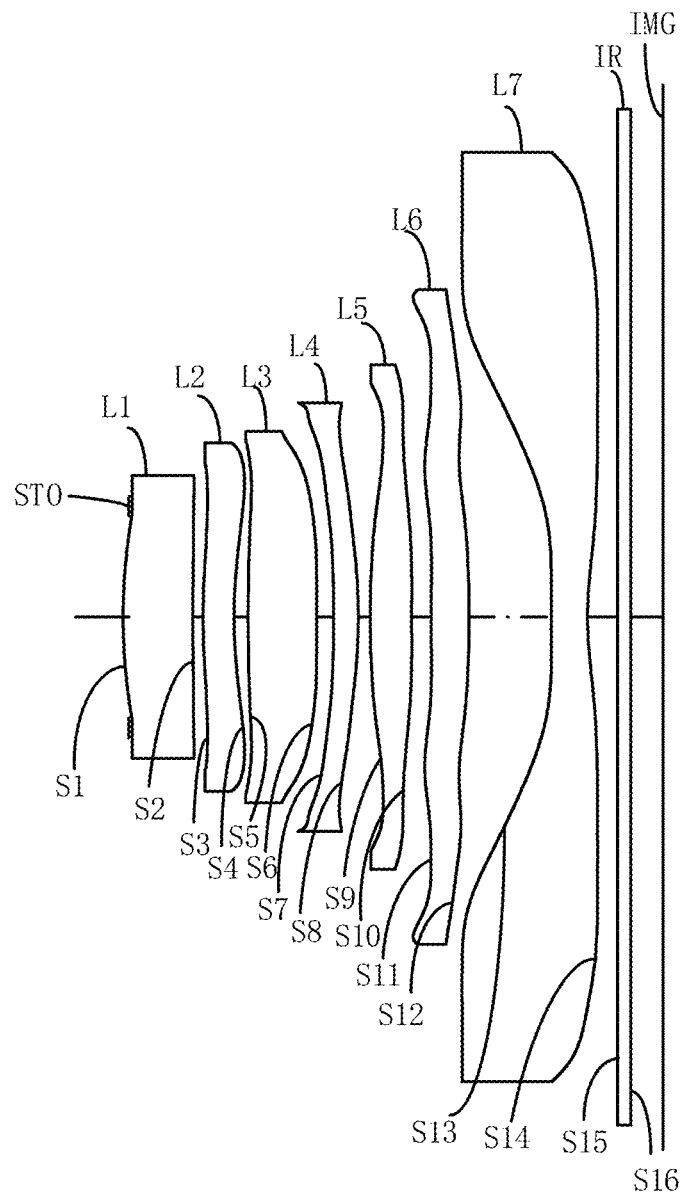
FIG. 4a is a schematic structural view of an optical system according to an implementation.
Figure 4B:
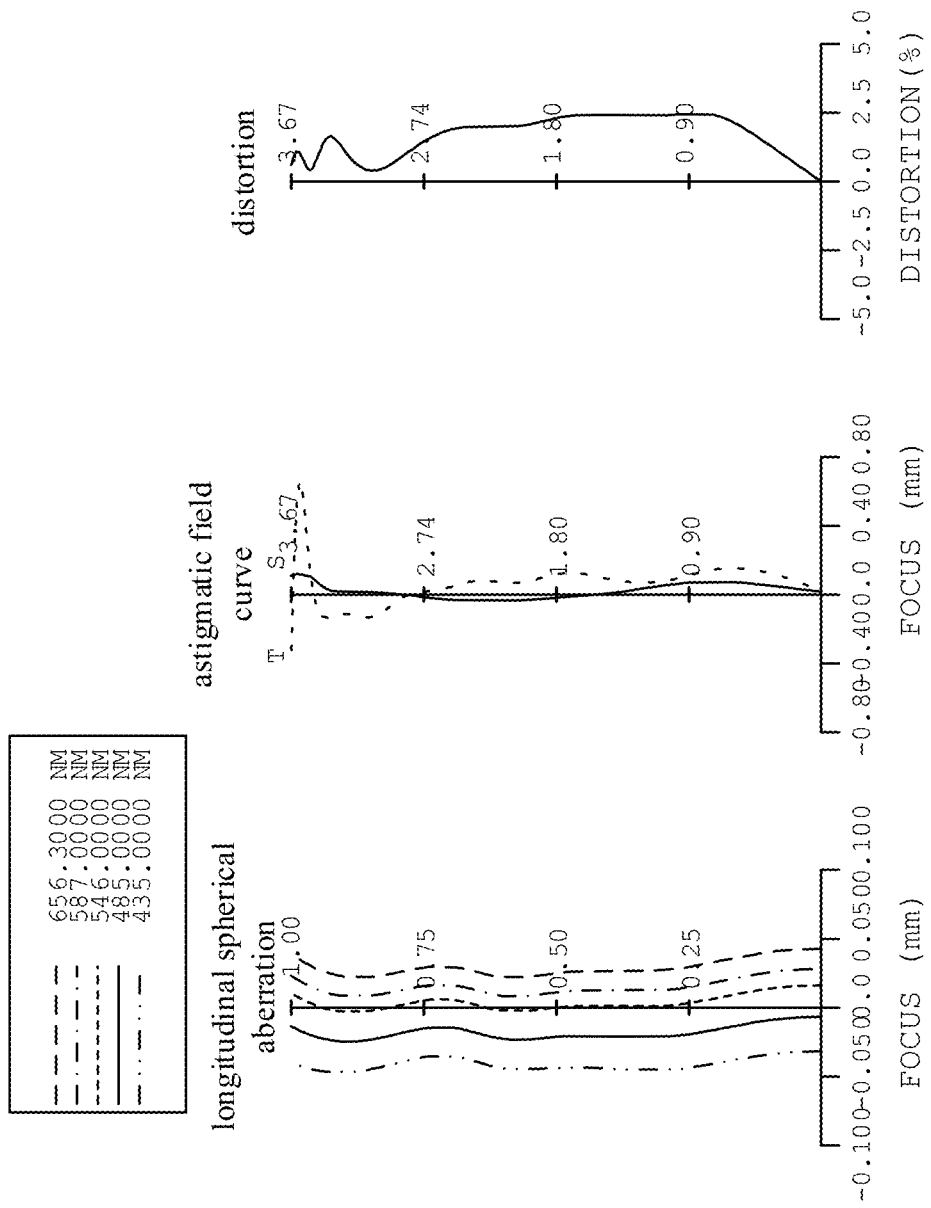

Referring to FIG. 4a and FIG. 4b, the optical system in this implementation includes, in order from the object side to the image side along the optical axis, the first lens L1, the second lens L2, the third lens L3, the fourth lens L4, the fifth lens L5, the sixth lens L6, and the seventh lens L7.

The first lens L1 has a positive refractive power. The object-side surface S1 of the first lens L1 is convex near the optical axis and is convex near a periphery of the object-side surface S1 of the first lens L1. The image-side surface S2 of the first lens L1 is concave near the optical axis and is convex near a periphery of the image-side surface S2 of the first lens L1.

The second lens L2 has a negative refractive power. The object-side surface S3 of the second lens L2 is convex near the optical axis and is concave near a periphery of the object-side surface S3 of the second lens L2. The image-side surface S4 of the second lens L2 is concave near the optical axis and is convex near a periphery of the image-side surface S4 of the second lens L2.

The third lens L3 has a positive refractive power. The object-side surface S5 of the third lens L3 is convex near the optical axis and is concave near a periphery of the object-side surface S5 of the third lens L3. The image-side surface S6 of the third lens L3 is convex near the optical axis and is convex near a periphery of the image-side surface S6 of the third lens L3.

The fourth lens L4 has a positive refractive power. The object-side surface S7 of the fourth lens L4 is concave near the optical axis and is concave near a periphery of the object-side surface S7 of the fourth lens L4. The image-side surface S8 of the fourth lens L4 is convex near the optical axis and is concave near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is concave near the optical axis and is convex near a periphery of the image-side surface S10 of the fifth lens L5.

The sixth lens L6 has a positive refractive power. At least one of the object-side surface S11 and the image-side surface S12 of the sixth lens L6 has at least one inflection point. The object-side surface S11 of the sixth lens L6 is convex near the optical axis and is concave near a periphery of the object-side surface S11 of the sixth lens L6. The image-side surface S12 of the sixth lens L6 is convex near the optical axis and is convex near a periphery of image-side surface S12 of the sixth lens L6.

The seventh lens L7 has a negative refractive power. At least one of the object-side surface S13 and the image-side surface S14 of the seventh lens L7 has at least one inflection point. The object-side surface S13 of the seventh lens L7 is convex near the optical axis and is convex near a periphery of the object-side surface S13 of the seventh lens L7. The image-side surface S14 of the seventh lens L7 is concave near the optical axis and is convex near a periphery of image-side surface S14 of the seventh lens L7.

The other structures of the optical system of FIG. 4a are identical with the optical system of FIG. 1a, reference can be made to the optical system of FIG. 1a.

Table 4a illustrated characteristics of the optical system in this implementation. Each data in Table 4a is obtained based on the visible light with a wavelength of 546 nm. Each of the Y radius, thickness, and focal length is in units of millimeter (mm).

TABLE 4a

Optical system of FIG. 4a
f = 2.85, FNO = 2.05, FOV = 102.0, TTL = 4.56

| Surface Number Object number | Surface Name | Shape Spherical | Y Radius Infinity | Thickness Infinity | Material | Refractive Index | Abbe Number | Focal length |
|---|---|---|---|---|---|---|---|---|
| ST0 | Stop | Spherical | Infinity | −0.049 | | | | |
| S1 | First | Aspherical | 3.291 | 0.588 | Plastic | 1.545 | 55.912 | 8.239 |
| S2 | lens | Aspherical | 11.453 | 0.086 | | | | |
| S3 | Second | Aspherical | 3.477 | 0.262 | Plastic | 1.661 | 20.412 | −17.796 |
| S4 | lens | Aspherical | 2.609 | 0.119 | | | | |
| S5 | Third | Aspherical | 9.503 | 0.580 | Plastic | 1.545 | 55.912 | 13.495 |
| S6 | lens | Aspherical | −32.209 | 0.140 | | | | |
| S7 | Fourth | Aspherical | −10.577 | 0.210 | Plastic | 1.545 | 55.912 | 8.707 |
| S8 | lens | Aspherical | −3.305 | 0.100 | | | | |
| S9 | Fifth | Aspherical | 4.337 | 0.349 | Plastic | 1.661 | 20.412 | 7.348 |
| S10 | lens | Aspherical | 35.939 | 0.166 | | | | |
| S11 | Sixth | Aspherical | 75.900 | 0.320 | Plastic | 1.545 | 55.912 | 9.231 |
| S12 | lens | Aspherical | −5.395 | 0.692 | | | | |
| S13 | Seventh | Aspherical | 10.811 | 0.307 | Plastic | 1.545 | 55.912 | −4.524 |
| S14 | lens | Aspherical | 1.992 | 0.252 | | | | |
| S15 | Infrared | Spherical | Infinity | 0.110 | Glass | 1.517 | 64.167 | |
| S16 | cut-off filter IR | Spherical | Infinity | 0.274 | | | | |
| IMG | Image plane | Spherical | Infinity | 0.000 | | | | |

Note:
The reference wavelength is 546 nm

Each parameter in Table 4a represents the same meaning as that in the optical system of FIG. 1a.

Table 4b shows higher-order coefficients that can be used for each aspherical lens surface in the optical system of FIG. 4a, where a shape of each aspherical lens surface can be defined by the formula given in the optical system of FIG. 1a.

TABLE 4b

Optical system of FIG. 4a
Aspherical coefficients

| Surface Number | S1 | S2 | S3 | S4 | S5 | S6 | S7 |
|---|---|---|---|---|---|---|---|
| K   | −3.1818E+00 | −3.6528E+01 | −7.1015E+01 | −1.5477E+01 |  2.7722E+01 |  5.0675E+01 |  3.2011E+01 |
| A4  |  8.8349E−02 | −2.9974E−02 |  2.9795E−02 | −1.6818E−01 | −1.0599E−01 |  1.9866E−01 |  1.8566E−01 |
| A6  | −8.2926E−01 | −1.2735E+00 | −3.0955E−01 |  1.2667E+00 |  2.1900E−01 | −2.4130E+00 | −1.8231E+00 |
| A8  | −1.9333E+00 |  1.0090E+01 | −1.1077E+00 | −5.5790E+00 |  6.4241E−01 |  7.6221E+00 |  5.2038E+00 |
| A10 |  8.7787E+01 | −4.2477E+01 |  9.4899E+00 |  1.4062E+01 | −4.0119E+00 | −1.2995E+01 | −7.5706E+00 |
| A12 | −6.7125E+02 |  1.1330E+02 | −2.5688E+01 | −2.1711E+01 |  8.6757E+00 |  1.3432E+01 |  6.2625E+00 |
| A14 |  2.5360E+03 | −1.9323E+02 |  3.6354E+01 |  2.0849E+01 | −1.0213E+01 | −8.6536E+00 | −2.8955E+00 |
| A16 | −5.2692E+03 |  2.0208E+02 | −2.9043E+01 | −1.2259E+01 |  6.8232E+00 |  3.3581E+00 |  6.2398E−01 |
| A18 |  5.7619E+03 | −1.1711E+02 |  1.2526E+01 |  4.0808E+00 | −2.4122E+00 | −7.0664E−01 | −7.6184E−03 |
| A20 | −2.5959E+03 |  2.8629E+01 | −2.3000E+00 | −5.9497E−01 |  3.4937E−01 |  6.0932E−02 | −1.2970E−02 |

| Surface Number | S8 | S9 | S10 | S11 | S12 | S13 | S14 |
|---|---|---|---|---|---|---|---|
| K   | −7.6348E+01 | −8.4102E+01 |  9.2956E+01 |  9.9000E+01 | −1.7418E+01 |  1.2218E+01 | −2.2028E+00 |
| A4  | −2.9148E−01 | −1.1400E−01 | −1.5207E−01 |  1.0780E−01 |  1.7862E−01 | −3.8187E−01 | −3.2067E−01 |
| A6  |  7.2950E−01 |  5.9421E−01 | −9.7906E−02 | −9.7006E−01 | −7.2877E−01 |  2.5237E−01 |  2.5739E−01 |
| A8  | −3.3202E−01 | −9.7562E−01 |  6.2413E−01 |  1.6967E+00 |  1.0946E+00 | −8.2429E−02 | −1.2090E−01 |
| A10 | −1.3223E+00 |  9.0882E−01 | −8.7387E−01 | −1.3813E+00 | −8.0980E−01 |  9.1322E−03 |  3.5707E−02 |
| A12 |  2.4762E+00 | −6.3199E−01 |  6.5521E−01 |  6.3470E−01 |  3.4044E−01 |  2.3425E−03 | −6.7495E−03 |
| A14 | −1.9408E+00 |  3.4966E−01 | −2.9284E−01 | −1.7502E−01 | −8.5774E−02 | −9.4595E−04 |  8.0988E−04 |
| A16 |  7.9832E−01 | −1.3449E−01 |  7.7688E−02 |  2.8812E−02 |  1.2863E−02 |  1.3444E−04 | −5.9396E−05 |
| A18 | −1.6790E−01 |  2.9493E−02 | −1.1293E−02 | −2.6181E−03 | −1.0606E−03 | −8.9902E−06 |  2.4203E−06 |
| A20 |  1.4125E−02 | −2.6986E−03 |  6.9400E−04 |  1.0133E−04 |  3.7066E−05 |  2.3574E−07 | −4.1885E−08 |

FIG. 4b illustrates a longitudinal spherical aberration curve, an astigmatic field curve, and a distortion curve of the optical system of FIG. 4a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 4b, the optical system of the FIG. 4a can achieve good imaging quality.

Figure 5A:
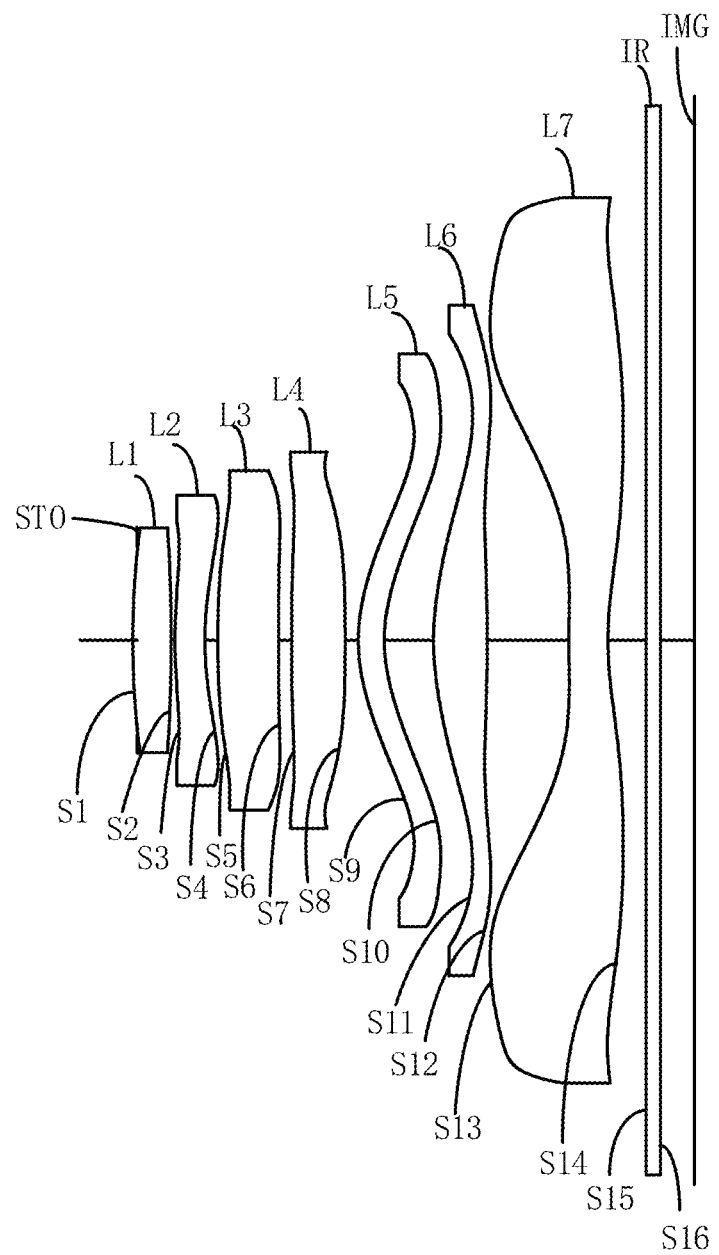
FIG. 5a is a schematic structural view of an optical system according to an implementation.
Figure 5B:
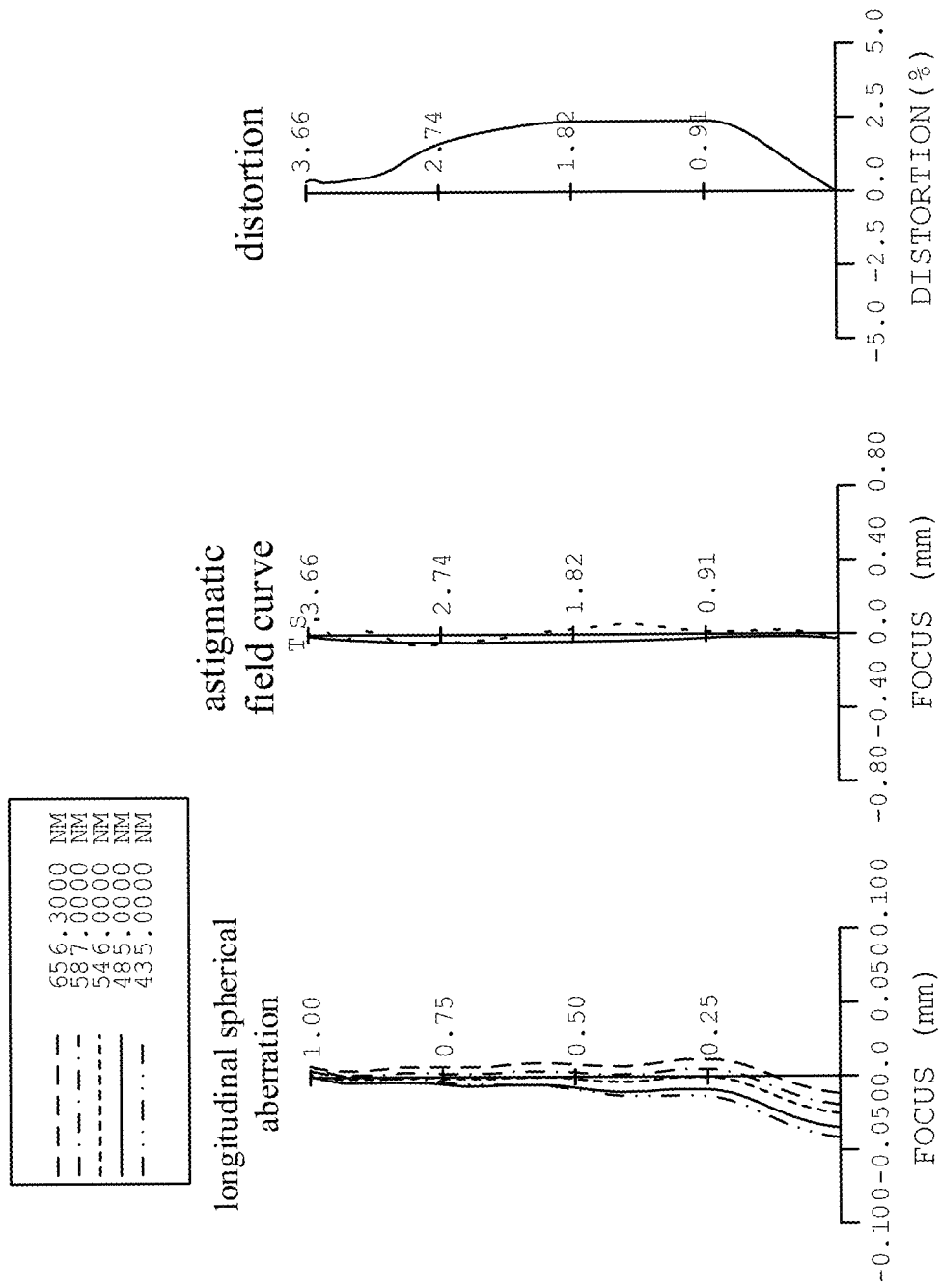

Referring to FIG. 5a and FIG. 5b, the optical system in this implementation includes, in order from the object side to the image side along the optical axis, the first lens L1, the second lens L2, the third lens L3, the fourth lens L4, the fifth lens L5, the sixth lens L6, and the seventh lens L7.

The first lens L1 has a positive refractive power. The object-side surface S1 of the first lens L1 is convex near the optical axis and is convex near a periphery of the object-side surface S1 of the first lens L1. The image-side surface S2 of the first lens L1 is convex near the optical axis and is concave near a periphery of the image-side surface S2 of the first lens L1.

The second lens L2 has a negative refractive power. The object-side surface S3 of the second lens L2 is convex near the optical axis and is concave near a periphery of the object-side surface S3 of the second lens L2. The image-side surface S4 of the second lens L2 is concave near the optical axis and is convex near a periphery of the image-side surface S4 of the second lens L2.

The third lens L3 has a positive refractive power. The object-side surface S5 of the third lens L3 is convex near the optical axis and is concave near a periphery of the object-side surface S5 of the third lens L3. The image-side surface S6 of the third lens L3 is concave near the optical axis and is convex near a periphery of the image-side surface S6 of the third lens L3.

The fourth lens L4 has a positive refractive power. The object-side surface S7 of the fourth lens L4 is convex near the optical axis and is concave near a periphery of the object-side surface S7 of the fourth lens L4. The image-side surface S8 of the fourth lens L4 is convex near the optical axis and is concave near a periphery of the image-side surface S8 of the fourth lens L4.

The fifth lens L5 has a negative refractive power. The object-side surface S9 of the fifth lens L5 is convex near the optical axis and is concave near a periphery of the object-side surface S9 of the fifth lens L5. The image-side surface S10 of the fifth lens L5 is concave near the optical axis and is convex near a periphery of the image-side surface S10 of the fifth lens L5.

The sixth lens L6 has a positive refractive power. At least one of the object-side surface S11 and the image-side surface S12 of the sixth lens L6 has at least one inflection point. The object-side surface S11 of the sixth lens L6 is convex near the optical axis and is concave near a periphery of the object-side surface S11 of the sixth lens L6. The image-side surface S12 of the sixth lens L6 is convex near the optical axis and is convex near a periphery of image-side surface S12 of the sixth lens L6.

The seventh lens L7 has a negative refractive power. At least one of the object-side surface S13 and the image-side surface S14 of the seventh lens L7 has at least one inflection point. The object-side surface S13 of the seventh lens L7 is convex near the optical axis and is convex near a periphery of the object-side surface S13 of the seventh lens L7. The image-side surface S14 of the seventh lens L7 is concave near the optical axis and is concave near a periphery of image-side surface S14 of the seventh lens L7.

The other structures of the optical system in FIG. 5a are identical with the optical system of FIG. 1a, reference can be made to the optical system of FIG. 1a.

Table 5a illustrates characteristics of the optical system in this implementation. Each data in Table 5a is obtained based on the visible light with a wavelength of 546 nm. Each of Y radius, thickness, and focal length is in units of millimeter (mm).

TABLE 5a

Optical system of FIG. 5a
f = 2.67, FNO = 2.1, FOV = 105.0, TTL = 4.33

| Surface Number Object number | Surface Name | Shape Spherical | Y Radius Infinity | Thickness Infinity | Material | Refractive Index | Abbe Number | Focal length |
|---|---|---|---|---|---|---|---|---|
| ST0 | Stop | Spherical | Infinity | −0.032 | | | | |
| S1 | First lens | Aspherical | 5.086 | 0.296 | Plastic | 1.545 | 55.912 | 6.906 |
| S2 | | Aspherical | −14.330 | 0.030 | | | | |
| S3 | Second lens | Aspherical | 2.994 | 0.230 | Plastic | 1.661 | 20.412 | −8.912 |
| S4 | | Aspherical | 1.931 | 0.100 | | | | |
| S5 | Third lens | Aspherical | 7.852 | 0.468 | Plastic | 1.545 | 55.912 | 38.717 |
| S6 | | Aspherical | 12.222 | 0.100 | | | | |
| S7 | Fourth lens | Aspherical | 6.931 | 0.414 | Plastic | 1.545 | 55.912 | 8.218 |
| S8 | | Aspherical | −12.487 | 0.100 | | | | |
| S9 | Fifth lens | Aspherical | 1.020 | 0.200 | Plastic | 1.661 | 20.412 | −34.454 |
| S10 | | Aspherical | 0.900 | 0.380 | | | | |
| S11 | Sixth lens | Aspherical | 1.601 | 0.413 | Plastic | 1.545 | 55.912 | 2.677 |
| S12 | | Aspherical | −15.453 | 0.630 | | | | |
| S13 | Seventh lens | Aspherical | 8.796 | 0.300 | Plastic | 1.545 | 55.912 | −4.850 |
| S14 | | Aspherical | 2.012 | 0.295 | | | | |
| S15 | Infrared cut-off filter IR | Spherical | Infinity | 0.110 | Glass | 1.517 | 64.167 | |
| S16 | | Spherical | Infinity | 0.263 | | | | |
| IMG plane | Image | Spherical | Infinity | 0.000 | | | | |

Note:
The reference wavelength is 546 nm

Each parameter in Table 5a represents the same meaning as that in the optical system of FIG. 1a.

Table 5b shows higher-order coefficients that can be used for each aspherical lens surface in the optical system of FIG. 5a, where a shape of each aspherical lens surface can be defined by the formula given in the optical system of FIG. 1a.

TABLE 5b

Optical system of FIG. 5a
Aspherical coefficients

| Surface Number | S1 | S2 | S3 | S4 | S5 | S6 | S7 |
|---|---|---|---|---|---|---|---|
| K | −2.0945E+00 | −9.9000E+01 | −6.5030E+01 | −1.0172E+01 | 5.2409E+01 | 9.2482E+01 | 1.7788E+01 |
| A4 | −9.2598E−02 | −5.2988E−02 | 2.0647E−02 | 6.3748E−02 | 1.1895E−01 | −4.1800E−01 | −4.2943E−01 |
| A6 | 2.6641E+00 | −6.4653E−01 | −8.1321E−01 | −6.7535E−01 | 2.0566E−01 | 2.9229E+00 | 2.2386E+00 |
| A8 | −3.7214E+01 | 1.0261E+01 | 3.1364E+00 | 2.3625E+00 | −3.0510E+00 | −1.1561E+01 | −7.2681E+00 |
| A10 | 2.9643E+02 | −6.9022E+01 | −5.4037E+00 | −5.4162E+00 | 1.2807E+01 | 2.9014E+01 | 1.5570E+01 |
| A12 | −1.4327E+03 | 2.6607E+02 | −1.0490E+01 | 7.2837E+00 | −3.0542E+01 | −4.8207E+01 | −2.2711E+01 |
| A14 | 4.2734E+03 | −6.0543E+02 | 7.8205E+01 | −4.7075E+00 | 4.4547E+01 | 5.2439E+01 | 2.2228E+01 |
| A16 | −7.6766E+03 | 7.7207E+02 | −1.8027E+02 | −6.9818E−01 | −3.9479E+01 | −3.5821E+01 | −1.3948E+01 |
| A18 | 7.5989E+03 | −4.7999E+02 | 1.9454E+02 | 2.8253E+00 | 1.9500E+01 | 1.3872E+01 | 5.0474E+00 |
| A20 | −3.1758E+03 | 9.8254E+01 | −8.1386E+01 | −1.1623E+00 | −4.1098E+00 | −2.3092E+00 | −7.9532E−01 |

| Surface Number | S8 | S9 | S10 | S11 | S12 | S13 | S14 |
|---|---|---|---|---|---|---|---|
| K | 3.7994E+01 | −7.8951E+00 | −8.3497E+00 | −1.7179E+01 | −4.3691E+01 | 5.5580E+00 | −2.0625E+00 |
| A4 | −4.2382E−02 | 2.9338E−01 | 2.6540E−01 | 8.5272E−02 | −7.4066E−02 | −3.6638E−01 | −2.2608E−01 |
| A6 | −4.3149E−01 | −5.3755E−01 | −4.5085E−01 | −1.1010E−01 | 2.1057E−01 | 2.6721E−01 | 1.3880E−01 |
| A8 | 1.7334E+00 | 6.0661E−01 | 4.3977E−01 | 1.3929E−01 | −1.9091E−01 | −1.2569E−01 | −5.0795E−02 |
| A10 | −4.0657E+00 | −4.7889E−01 | −2.8181E−01 | −1.3910E−01 | 9.4985E−02 | 3.9457E−02 | 1.1347E−02 |
| A12 | 6.0248E+00 | 2.6053E−01 | 1.0907E−01 | 8.2796E−02 | −2.8702E−02 | −7.8171E−03 | −1.5184E−03 |
| A14 | −5.5941E+00 | −1.0071E−01 | −2.3727E−02 | −2.9249E−02 | 5.1595E−03 | 9.3206E−04 | 1.1012E−04 |
| A16 | 3.1307E+00 | 2.6933E−02 | 2.5033E−03 | 6.0771E−03 | −4.9625E−04 | −6.1541E−05 | −2.6117E−06 |
| A18 | −9.5238E−01 | −4.3615E−03 | −5.9547E−05 | −6.8799E−04 | 1.8003E−05 | 1.7986E−06 | −1.4036E−07 |
| A20 | 1.1959E−01 | 3.1108E−04 | −5.9636E−06 | 3.2785E−05 | 2.1751E−07 | −6.3965E−09 | 7.4160E−09 |

FIG. 5b illustrates a longitudinal spherical aberration curve, an astigmatic field curve, and a distortion curve of the optical system of FIG. 5a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 5b, the optical system of FIG. 5a can achieve good imaging quality.

Figure 6A:
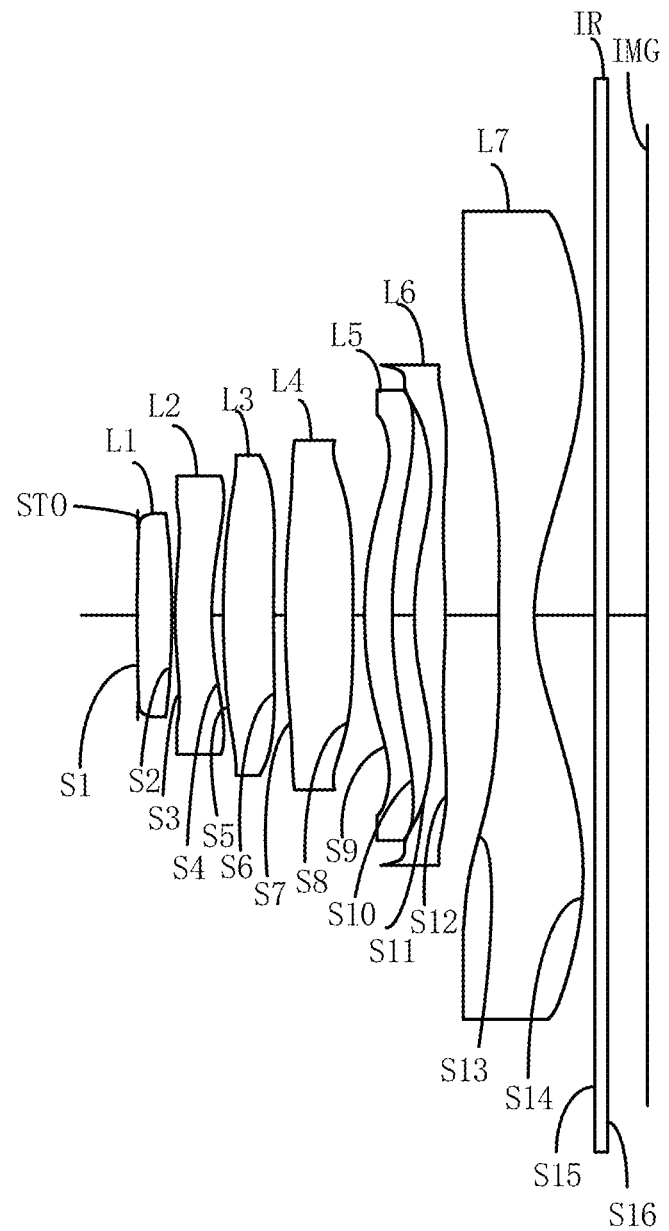
FIG. 6a is a schematic structural view of an optical system according to an implementation.
Figure 6B:
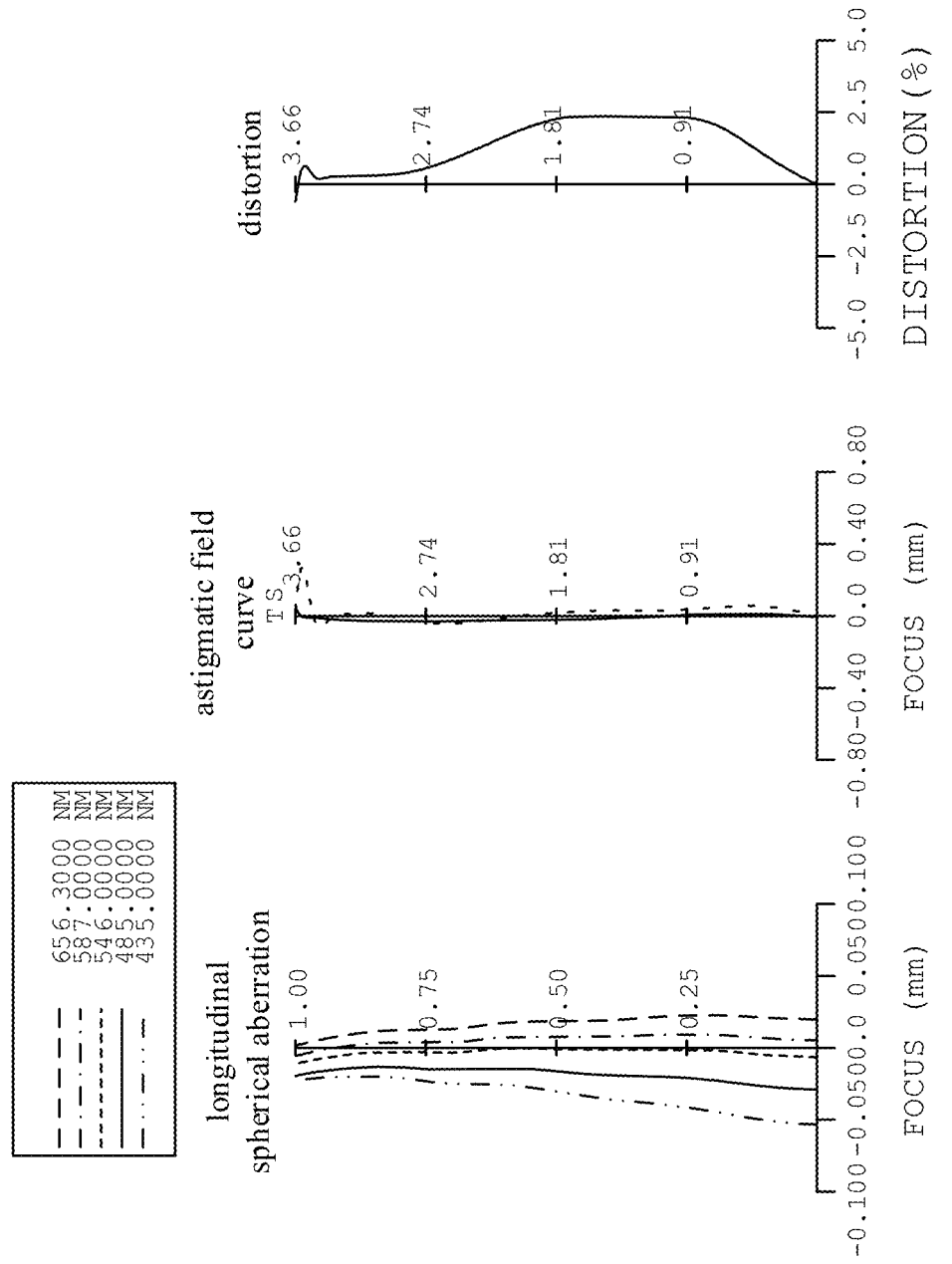

Referring to FIG. 6a and FIG. 6b, in order from the object side to the image side along the optical axis, the first lens L1, the second lens L2, the third lens L3, the fourth lens L4, the fifth lens L5, the sixth lens L6, and the seventh lens L7.

The first lens L1 has a positive refractive power. The object-side surface S1 of the first lens L1 is convex near the optical axis and is convex near a periphery of the object-side surface S1 of the first lens L1. The image-side surface S2 of the first lens L1 is convex near the optical axis and is convex near a periphery of the image-side surface S2 of the first lens L1.

The second lens L2 has a negative refractive power. The object-side surface S3 of the second lens L2 is convex near the optical axis and is concave near a periphery of the object-side surface S3 of the second lens L2. The image-side surface S4 of the second lens L2 is concave near the optical axis and is convex near a periphery of the image-side surface S4 of the second lens L2.

The third lens L3 has a positive refractive power. The object-side surface S5 of the third lens L3 is convex near the optical axis and is convex near a periphery of the object-side surface S5 of the third lens L3. The image-side surface S6 of the third lens L3 is concave near the optical axis and is convex near a periphery of the image-side surface S6 of the third lens L3.

The fourth lens L4 has a positive refractive power. The object-side surface S7 of the fourth lens L4 is concave near the optical axis and is convex near a periphery of the object-side surface S7 of the fourth lens L4. The image-side surface S8 of the fourth lens L4 is convex near the optical axis and is concave near a periphery of the image-side surface S8 of the fourth lens L4.

The fifth lens L5 has a positive refractive power. The object-side surface S9 of the fifth lens L5 is convex near the optical axis and is concave near a periphery of the object-side surface S9 of the fifth lens L5. The image-side surface S10 of the fifth lens L5 is concave near the optical axis and is convex near a periphery of the image-side surface S10 of the fifth lens L5.

The sixth lens L6 has a positive refractive power. At least one of the object-side surface S11 and the image-side surface S12 of the sixth lens L6 has at least one inflection point. The object-side surface S11 of the sixth lens L6 is convex near the optical axis and is concave near a periphery of the object-side surface S11 of the sixth lens L6. The image-side surface S12 of the sixth lens L6 is convex near the optical axis and is concave near a periphery of image-side surface S12 of the sixth lens L6.

The seventh lens L7 has a negative refractive power. At least one of the object-side surface S13 and the image-side surface S14 of the seventh lens L7 has at least one inflection point. The object-side surface S13 of the seventh lens L7 is convex near the optical axis and is concave near a periphery of the object-side surface S13 of the seventh lens L7. The image-side surface S14 of the seventh lens L7 is concave near the optical axis and is convex near a periphery of image-side surface S14 of the seventh lens L7.

The other structures of the optical system in FIG. 6a are identical with the optical system of FIG. 1a, reference can be made to the optical system of FIG. 1a.

Table 6a illustrates characteristics of the optical system in this implementation. Each data in Table 6a is obtained based on the visible light with a wavelength of 546 nm. Each of Y radius, thickness, and focal length is in units of millimeter (mm).

TABLE 6a

Optical system of FIG. 6a
f = 2.73 , FNO = 2.1, FOV = 104.2, TTL = 4.36

| Surface Number Object number | Surface Name | Shape Spherical | Y Radius Infinity | Thickness Infinity | Material | Refractive Index | Abbe Number | Focal length |
|---|---|---|---|---|---|---|---|---|
| ST0 | Stop | Spherical | Infinity | −0.007 | | | | |
| S1 | First | Aspherical | 14.361 | 0.295 | Plastic | 1.545 | 55.912 | 10.613 |
| S2 | lens | Aspherical | −9.658 | 0.030 | | | | |
| S3 | Second | Aspherical | 2.717 | 0.313 | Plastic | 1.661 | 20.412 | −19.410 |
| S4 | lens | Aspherical | 2.143 | 0.100 | | | | |
| S5 | Third | Aspherical | 8.573 | 0.428 | Plastic | 1.545 | 55.912 | 30.892 |
| S6 | lens | Aspherical | 17.112 | 0.100 | | | | |
| S7 | Fourth | Aspherical | 6.224 | 0.576 | Plastic | 1.545 | 55.912 | 12.906 |
| S8 | lens | Aspherical | 51.210 | 0.100 | | | | |
| S9 | Fifth | Aspherical | 2.771 | 0.238 | Plastic | 1.661 | 20.412 | 10.679 |
| S10 | lens | Aspherical | 4.374 | 0.190 | | | | |
| S11 | Sixth | Aspherical | 2.239 | 0.264 | Plastic | 1.545 | 55.912 | 2.911 |
| S12 | lens | Aspherical | −5.263 | 0.455 | | | | |
| S13 | Seventh | Aspherical | 7.906 | 0.306 | Plastic | 1.545 | 55.912 | −3.121 |
| S14 | lens | Aspherical | 1.384 | 0.515 | | | | |
| S15 | Infrared | Spherical | Infinity | 0.110 | | | | |
| S16 | cut-off filter IR | Spherical | Infinity | 0.340 | Glass | 1.517 | 64.167 | |
| IMG | Image plane | Spherical | Infinity | 0.000 | | | | |

Note:
The reference wavelength is 546 nm

Each parameter in Table 6a represents the same meaning as that in the optical system of FIG. T a.

Figure 7A:
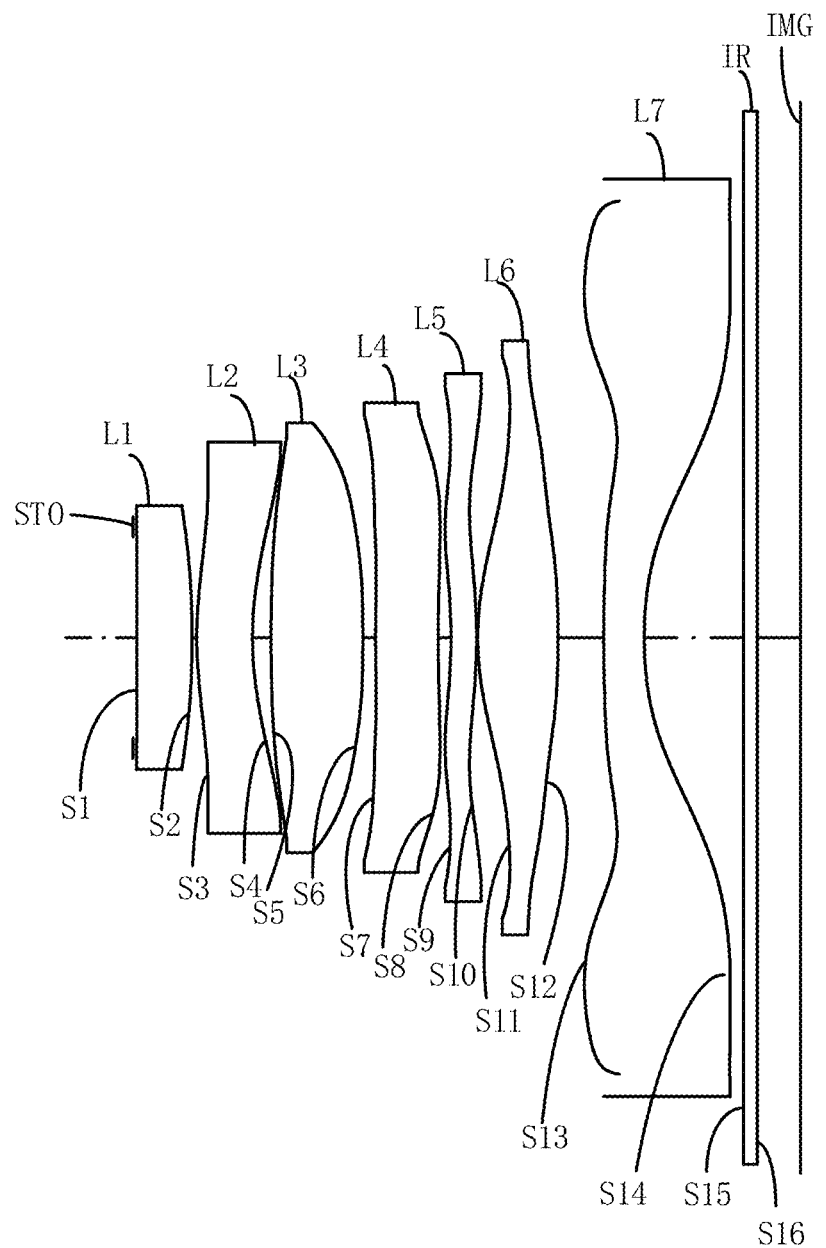
FIG. 7a is a schematic structural view of an optical system according to an implementation.

Table 6b shows higher-order coefficients that can be used for each aspherical lens surface in the optical system of FIG. 6a, where a shape of each aspherical lens surface can be defined by the formula given in the optical system of FIG. 7a.

TABLE 6b

Optical system of FIG. 6a
Aspherical coefficients

| Surface Number | S1 | S2 | S3 | S4 | S5 | S6 | S7 |
|---|---|---|---|---|---|---|---|
| K | 2.6294E+01 | 9.9000E+01 | −7.5413E+01 | −1.1497E+01 | 5.1493E+01 | −9.9000E+01 | 1.7372E+01 |
| A4 | −1.1888E−02 | −2.9513E−01 | 5.0556E−02 | 3.0921E−02 | 6.0504E−02 | −1.6891E−01 | −1.9667E−01 |
| A6 | 4.4280E−02 | 2.0667E+00 | −2.5196E−01 | −1.5661E−01 | 3.4191E−02 | 1.2103E+00 | 1.2199E+00 |
| A8 | 3.1430E+00 | −9.7633E+00 | −1.0321E+00 | −2.5694E−02 | −6.7196E−01 | −4.9032E+00 | −4.1742E+00 |
| A10 | −5.7217E+01 | 3.1848E+01 | 8.7965E+00 | 8.7693E−01 | 2.3734E+00 | 1.1580E+01 | 8.6176E+00 |
| A12 | 4.5693E+02 | −6.9779E+01 | −3.5433E+01 | −3.1468E+00 | −4.7503E+00 | −1.7648E+01 | −1.1456E+01 |
| A14 | −1.9983E+03 | 9.4639E+01 | 8.3318E+01 | 6.0267E+00 | 6.0023E+00 | 1.7335E+01 | 9.7192E+00 |
| A16 | 4.9426E+03 | −6.4025E+01 | −1.1455E+02 | −6.6083E+00 | −4.7402E+00 | −1.0482E+01 | −5.0373E+00 |
| A18 | −6.4906E+03 | 5.0743E−01 | 8.4197E+01 | 3.8509E+00 | 2.1058E+00 | 3.5151E+00 | 1.4455E+00 |
| A20 | 3.5189E+03 | 1.8744E+01 | −2.5233E+01 | −9.2254E−01 | −3.9747E−01 | −4.9679E−01 | −1.7541E−01 |

| | S8 | S9 | S10 | S11 | S12 | S13 | S14 |
|---|---|---|---|---|---|---|---|
| K | −9.9000E+01 | −1.6743E+01 | −4.6885E+01 | −1.6274E+01 | −5.1604E+00 | 6.7274E+00 | −2.4630E+00 |
| A4 | −2.2977E−01 | 2.1311E−01 | 4.6302E−01 | 3.1673E−01 | 1.1512E−01 | −2.3825E−01 | −1.1320E−01 |
| A6 | 4.2474E−01 | −5.8296E−01 | −1.7966E+00 | −9.1098E−01 | 6.2614E−02 | 2.8789E−01 | 6.8080E−02 |
| A8 | −4.6017E−01 | 1.2283E+00 | 3.7904E+00 | 1.2757E+00 | −1.8995E−01 | −2.1980E−01 | −3.2692E−02 |
| A10 | −5.9328E−01 | −1.5895E+00 | −4.7249E+00 | −1.2196E+00 | 1.4882E−01 | 1.0450E−01 | 1.0772E−02 |
| A12 | 2.2527E+00 | 1.1880E+00 | 3.6353E+00 | 7.6691E−01 | −6.0547E−02 | −3.2289E−02 | −2.3670E−03 |
| A14 | −2.7388E+00 | −5.1129E−01 | −1.7540E+00 | −2.9620E−01 | 1.3562E−02 | 6.5796E−03 | 3.4097E−04 |
| A16 | 1.7071E+00 | 1.1324E−01 | 5.1796E−01 | 6.4759E−02 | −1.6086E−03 | −8.5584E−04 | −3.0912E−05 |
| A18 | −5.4438E−01 | −7.0921E−03 | −8.5627E−02 | −6.8740E−03 | 1.0314E−04 | 6.4275E−05 | 1.5997E−06 |
| A20 | 7.0200E−02 | −9.5512E−04 | 6.0681E−03 | 2.2873E−04 | −4.9469E−06 | −2.1144E−06 | −3.6042E−08 |

FIG. 6b illustrates a longitudinal spherical aberration curve, an astigmatic field curve, and a distortion curve of the optical system of FIG. 6a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 6b, the optical system of the FIG. 6a can achieve good imaging quality.

Figure 7B:
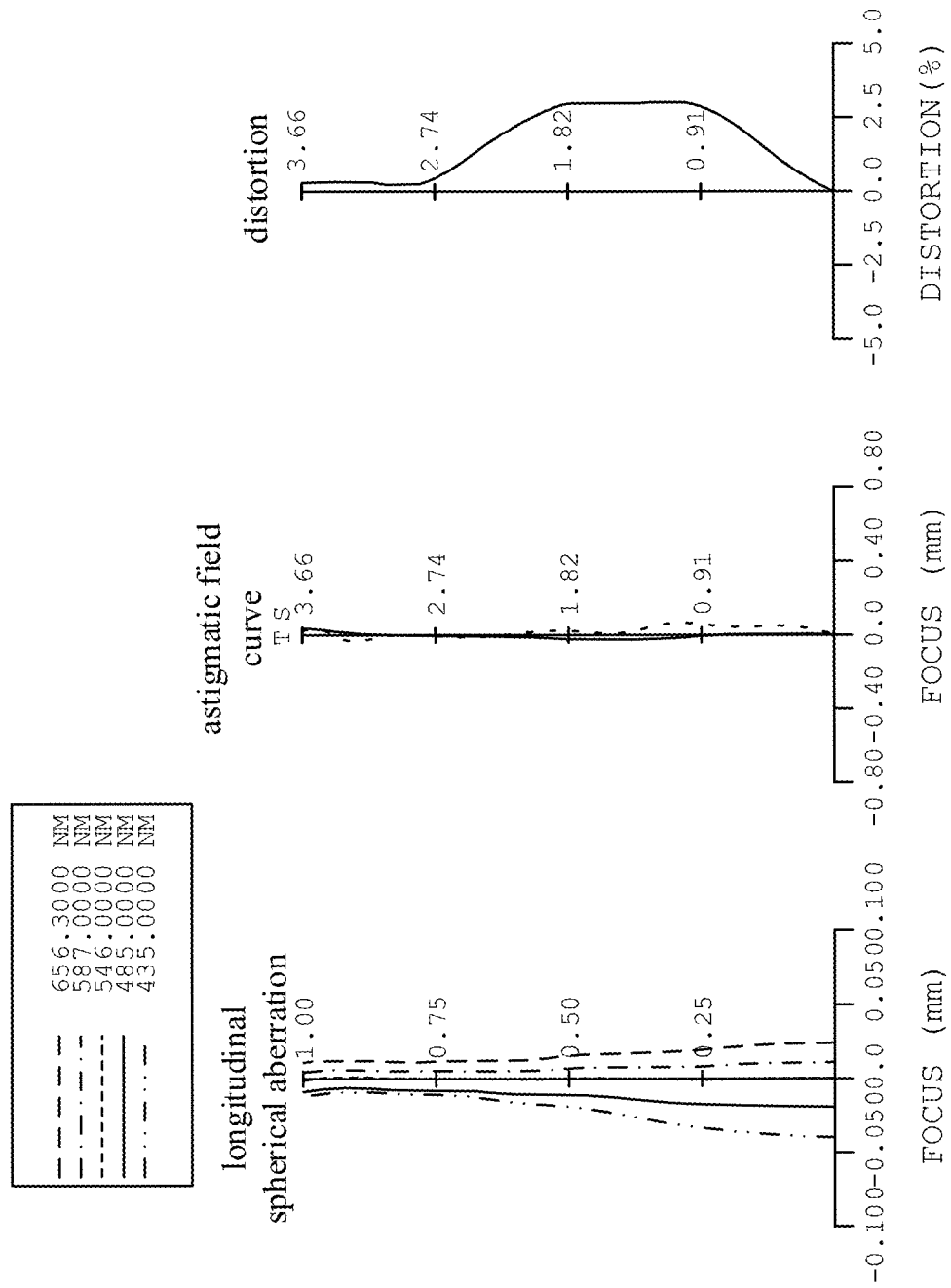

Referring to FIG. 7a and FIG. 7b, in order from the object side to the image side along the optical axis, the first lens L1, the second lens L2, the third lens L3, the fourth lens L4, the fifth lens L5, the sixth lens L6, and the seventh lens L7.

The first lens L1 has a positive refractive power. The object-side surface S1 of the first lens L1 is concave near the optical axis and is concave near a periphery of the object-side surface S1 of the first lens L1. The image-side surface S2 of the first lens L1 is convex near the optical axis and is convex near a periphery of the image-side surface S2 of the first lens L1.

The second lens L2 has a negative refractive power. The object-side surface S3 of the second lens L2 is convex near the optical axis and is concave near a periphery of the object-side surface S3 of the second lens L2. The image-side surface S4 of the second lens L2 is concave near the optical axis and is concave near a periphery of the image-side surface S4 of the second lens L2.

The third lens L3 has a positive refractive power. The object-side surface S5 of the third lens L3 is convex near the optical axis and is convex near a periphery of the object-side surface S5 of the third lens L3. The image-side surface S6 of the third lens L3 is convex near the optical axis and is convex near a periphery of the image-side surface S6 of the third lens L3.

The fourth lens L4 has a negative refractive power. The object-side surface S7 of the fourth lens L4 is convex near the optical axis and is concave near a periphery of the object-side surface S7 of the fourth lens L4. The image-side surface S8 of the fourth lens L4 is concave near the optical axis and is concave near a periphery of the image-side surface S8 of the fourth lens L4.

The fifth lens L5 has a negative refractive power. The object-side surface S9 of the fifth lens L5 is concave near the optical axis and is concave near a periphery of the object-side surface S9 of the fifth lens L5. The image-side surface S10 of the fifth lens L5 is convex near the optical axis and is convex near a periphery of the image-side surface S10 of the fifth lens L5.

The sixth lens L6 has a positive refractive power. At least one of the object-side surface S11 and the image-side surface S12 of the sixth lens L6 has at least one inflection point. The object-side surface S11 of the sixth lens L6 is convex near the optical axis and is concave near a periphery of the object-side surface S11 of the sixth lens L6. The image-side surface S12 of the sixth lens L6 is convex near the optical axis and is convex near a periphery of image-side surface S12 of the sixth lens L6.

The seventh lens L7 has a negative refractive power. At least one of the object-side surface S13 and the image-side surface S14 of the seventh lens L7 has at least one inflection point. The object-side surface S13 of the seventh lens L7 is convex near the optical axis and is convex near a periphery of the object-side surface S13 of the seventh lens L7. The image-side surface S14 of the seventh lens L7 is concave near the optical axis and is concave near a periphery of image-side surface S14 of the seventh lens L7.

The other structures of the optical system of FIG. 7a are identical with the optical system of FIG. 1a, reference can be made to the optical system of FIG. 1a.

Table 7a illustrates characteristics of the optical system in this implementation. Each data in Table 7a is obtained based on the visible light with a wavelength of 546 nm. Each of Y radius, thickness, and focal length is in units of millimeter (mm).

TABLE 7a

Optical system of FIG. 7a
f = 2.89 , FNO = 2.1, FOV = 101, TTL = 5.2

| Surface Number Object number | Surface Name | Shape Spherical | Y Radius Infinity | Thickness Infinity | Material | Refractive Index | Abbe Number | Focal length |
|---|---|---|---|---|---|---|---|---|
| ST0 | Stop | Spherical | Infinity | 0.032 | | | | |
| S1 | First | Aspherical | −345.081 | 0.432 | Plastic | 1.545 | 55.912 | 18.163 |
| S2 | lens | Aspherical | −9.652 | 0.038 | | | | |
| S3 | Second | Aspherical | 2.354 | 0.436 | Plastic | 1.661 | 20.412 | −63.283 |
| S4 | lens | Aspherical | 2.064 | 0.146 | | | | |
| S5 | Third | Aspherical | 11.840 | 0.720 | Plastic | 1.545 | 55.912 | 10.685 |
| S6 | lens | Aspherical | −11.271 | 0.100 | | | | |
| S7 | Fourth | Aspherical | 18.653 | 0.491 | Plastic | 1.545 | 55.912 | −347.836 |
| S8 | lens | Aspherical | 16.829 | 0.100 | | | | |
| S9 | Fifth | Aspherical | −3.359 | 0.200 | Plastic | 1.661 | 20.412 | −872.463 |
| S10 | lens | Aspherical | −3.459 | 0.010 | | | | |
| S11 | Sixth | Aspherical | 1.821 | 0.629 | Plastic | 1.545 | 55.912 | 2.7610 |
| S12 | lens | Aspherical | −7.741 | 0.357 | | | | |
| S13 | Seventh | Aspherical | 8.399 | 0.319 | Plastic | 1.545 | 55.912 | −6.3150 |
| S14 | lens | Aspherical | 2.413 | 0.777 | | | | |
| S15 | Infrared | Spherical | Infinity | 0.110 | | | | |
| S16 | cut-off filter IR | Spherical | Infinity | 0.338 | Glass | 1.517 | 64.167 | |
| IMG plane | Image | Spherical | Infinity | 0.000 | | | | |

Note:
The reference wavelength is 546 nm

Each parameter in Table 7a represents the same meaning as that in the optical system of FIG. 1a.

Table 7b shows higher-order coefficients that can be used for each aspherical lens surface in the optical system of FIG. 7a, where a shape of each aspherical lens surface can be defined by the formula given in the optical system of FIG. 1a.

TABLE 7b

Optical system of FIG. 7a
Aspherical coefficients

| Surface Number | S1 | S2 | S3 | S4 | S5 | S6 | S7 |
|---|---|---|---|---|---|---|---|
| K | −9.9000E+01 | 7.3779E+01 | −5.1476E+01 | −8.9325E+00 | 5.9381E+01 | 5.4390E+01 | −9.9000E+01 |
| A4 | 2.3305E−02 | −3.3798E−01 | 9.4101E−02 | 4.0545E−02 | −3.5971E−02 | −1.3449E−01 | 1.0144E−01 |
| A6 | −2.1260E−01 | 1.6574E+00 | −4.4428E−01 | −9.9707E−02 | 3.1551E−01 | −4.6772E−01 | −1.2241E+00 |
| A8 | −8.1701E−01 | −6.5000E+00 | 1.3104E+00 | 7.1803E−01 | −8.9873E−01 | 2.4980E+00 | 3.3992E+00 |
| A10 | 2.5979E+01 | 2.0271E+01 | −3.0509E+00 | 5.6778E−02 | 1.4903E+00 | −4.8228E+00 | −4.8349E+00 |
| A12 | −1.9483E+02 | −4.6484E+01 | 5.1180E+00 | −1.8912E−01 | −1.5542E+00 | 5.1314E+00 | 4.1028E+00 |
| A14 | 7.3689E+02 | 7.3636E+01 | −5.8469E+00 | 1.9314E−01 | 1.0237E+00 | −3.2921E+00 | −2.1674E+00 |
| A16 | −1.5354E+03 | −7.5195E+01 | 4.2332E+00 | −1.0358E−01 | −4.1331E−01 | 1.2681E+00 | 7.0000E−01 |
| A18 | 1.6794E+03 | 4.4278E+01 | −1.7270E+00 | 2.9369E−02 | 9.3621E−02 | −2.6985E−01 | −1.2655E−01 |
| A20 | −7.5412E+02 | −1.1383E+01 | 2.9944E−01 | −3.4710E−03 | −9.1524E−03 | 2.4353E−02 | 9.8059E−03 |

| | S8 | S9 | S10 | S11 | S12 | S13 | S14 |
|---|---|---|---|---|---|---|---|
| K | 9.9000E+01 | −9.6420E+01 | −3.0220E+01 | −9.5557E+00 | 4.9603E+00 | 6.9242E+00 | −1.7961E+00 |
| A4 | 1.3394E−01 | −2.7176E−01 | −1.2346E−02 | 1.2093E−01 | −2.0603E−01 | −1.0644E−01 | 1.7041E−01 |
| A6 | −6.6477E−01 | 1.0079E+00 | 1.2397E−01 | −2.9189E−01 | 3.6389E−01 | 2.4983E−01 | −1.4553E−01 |
| A8 | 1.3401E+00 | −1.3408E+00 | −6.1843E−02 | 2.9490E−01 | −2.7592E−01 | −2.1024E−01 | 5.4672E−02 |
| A10 | −1.6118E+00 | 1.0057E+00 | −1.5335E−02 | −1.8465E−01 | 1.1314E−01 | 8.5235E−02 | −1.2362E−02 |
| A12 | 1.1711E+00 | −4.8019E−01 | 2.4240E−02 | 7.5543E−02 | −2.6913E−02 | −1.9669E−02 | 1.7943E−03 |
| A14 | −5.1961E−01 | 1.4945E−01 | −9.6759E−03 | −1.9959E−02 | 3.7652E−03 | 2.7427E−03 | −1.6754E−04 |
| A16 | 1.3798E−01 | −2.9370E−02 | 1.9211E−03 | 3.2452E−03 | −2.9773E−04 | −2.2978E−04 | 9.6937E−06 |
| A18 | −2.0143E−02 | 3.3022E−03 | −1.9431E−04 | −2.9331E−04 | 1.1680E−05 | 1.0678E−05 | −3.1516E−07 |
| A20 | 1.2432E−03 | −1.6148E−04 | 7.9822E−06 | 1.1234E−05 | −1.5238E−07 | −2.1193E−07 | 4.3890E−09 |

FIG. 7b illustrates a longitudinal spherical aberration curve, an astigmatic field curve, and a distortion curve of the optical system of FIG. 7a. The longitudinal spherical aberration curve represents a focus deviation of each of light rays with different wavelengths after passing through each lens of the optical system. The astigmatic field curve represents a tangential field curvature and a sagittal field curvature. The distortion curve represents distortion values corresponding to different angles of view. As illustrated in FIG. 7b, the optical system of FIG. 6a can achieve good imaging quality.

Table 8 shows values of FOV, TTL/ImgH, FOV/TTL, |UDIS/f|, (|f4|+|f5|)/f, |SAG7/R72|, (CT1+CT2+CT3)/BFL, (SAG52+SAG61)/(ET5+CT6), and (f3+|f4|)/(R31+|R41|) of the optical system according to the optical systems of FIG. 1a, FIG. 2a, FIG. 3a, FIG. 4a, FIG. 5a, FIG. 6a, and FIG. 7a.

TABLE 8

|  | 101.0 ≤ FOV ≤ 105.0 | 1.1 < TTL/ImgH < 1.45 | 19.00 < FOV/TTL ≤ 25.00 |
|---|---|---|---|
| optical system of FIG. 1a | 101.0 | 1.20 | 23.06 |
| optical system of FIG. 2a | 104.0 | 1.14 | 25.00 |
| optical system of FIG. 3a | 103.0 | 1.18 | 23.79 |
| optical system of FIG. 4a | 102.0 | 1.25 | 22.37 |
| optical system of FIG. 5a | 105.0 | 1.18 | 24.25 |
| optical system of FIG. 6a | 104.2 | 1.19 | 23.90 |
| optical system of FIG. 7a | 101.0 | 1.42 | 19.42 |

|  | |HDIS/f| < 1.45 | 5.00 < (|f4| + |f5|)/f < 423.00 | |SAG71/R72| < 0.50 |
|---|---|---|---|
| optical system of FIG. 1a | 0.71 | 7.25 | 0.16 |
| optical system of FIG. 2a | 0.17 | 8.00 | 0.46 |
| optical system of FIG. 3a | 1.41 | 14.03 | 0.44 |
| optical system of FIG. 4a | 0.28 | 5.64 | 0.38 |
| optical system of FIG. 5a | 0.55 | 15.98 | 0.35 |
| optical system of FIG. 6a | 0.54 | 8.64 | 0.22 |
| optical system of FIG. 7a | 0.19 | 422.26 | 0.06 |

|  | 1.6 < (CT1 + CT2 + CT3)/ BFL < 2.90 | 0.3 < (SAG52 + SAG61)/(ET5 + CT6) < 1.20 | (f3 + |f4|)/ (R31 + |R41|) < 12.00 |
|---|---|---|---|
| optical system of FIG. 1a | 1.75 | 0.88 | 1.04 |
| optical system of FIG. 2a | 1.63 | 0.90 | 0.31 |
| optical system of FIG. 3a | 2.29 | 0.86 | 1.19 |
| optical system of FIG. 4a | 2.6 | 0.10 | 1.11 |
| optical system of FIG. 5a | 1.82 | 1.19 | 3.17 |
| optical system of FIG. 6a | 1.87 | 0.65 | 3.07 |
| optical system of FIG. 7a | 2.89 | 0.32 | 11.77 |

As illustrated in Table 8, each of the implementations of the present disclosure satisfies the following expressions. 101.0≤FOV≤105.0. 1.1<TTL/ImgH<1.45. 19.00<FOV/TTL≤25.00. |HDIS/f|<1.45. 5.00<(|f4|+|f5|)/f<423.00. |SAG71/R72|<0.50. 1.6<(CT1+CT2+CT3)/BFL<2.90. 0.3<(SAG52+SAG61)/(ET5+CT6)<1.20. (f3+|f4|)/(R31+|R41|)<12.00.

Preferred implementations of the present disclosure have been described above, which cannot be understood as limitations on the present disclosure. Those skilled in the art can appreciate all or part of processes of carrying out the above-mentioned implementations, make equivalent changes based on the claims of the present disclosure, and these equivalent changes are also considered to fall into the protection scope of the present disclosure.

What is claimed is:

1. An optical system comprising, in order from an object side to an image side along an optical axis:
   a first lens with a positive refractive power, wherein the first lens has an object-side surface and an image-side surface which are both aspherical;
   a second lens with a negative refractive power, wherein the second lens has an object-side surface which is convex near the optical axis, and an image-side surface which is concave near the optical axis;
   a third lens with a positive refractive power, wherein the third lens has an object-side surface which is convex near the optical axis, and an image-side surface which is convex near a periphery of the image-side surface of the third lens;
   a fourth lens with a refractive power, wherein the fourth lens has an object-side surface and an image-side surface which are both aspherical;
   a fifth lens with a refractive power, wherein the fifth lens has an object-side surface and an image-side surface which are both aspherical, and wherein at least one of the object-side surface and the image-side surface of the fifth lens has at least one inflection point;
   a sixth lens with a positive refractive power, wherein the sixth lens has an object-side surface which is convex near the optical axis, both the object-side surface and an image-side surface of the sixth lens are aspherical, and at least one of the object-side surface and the image-side surface of the sixth lens has at least one inflection point; and
   a seventh lens with a negative refractive power, wherein the seventh lens has an object-side surface which is convex near the optical axis, and an image-side surface which is concave near the optical axis, both the object-side surface and the image-side surface of the seventh lens are aspherical, and at least one of the object-side surface and the image-side surface of the seventh lens has at least one inflection point,
   wherein the optical system satisfies the following expression:
   101.0≤FOV≤105.0;
   wherein FOV represents the maximum angle of view of the optical system.

2. The optical system of claim 1, wherein the optical system satisfies the following expression:
   1.10<TTL/ImgH<1.45;
   wherein TTL represents a distance from the object-side surface of the first lens to an image plane on the optical axis, ImgH represents half of a diagonal length of an effective imaging region on the image plane.

3. The optical system of claim 1, wherein the optical system satisfies the following expression:
   19.00<FOV/TTL≤25.00;
   wherein TTL represents a distance from an object-side surface of the first lens to an image plane on the optical axis.

4. The optical system of claim 1, wherein the optical system satisfies the following expression:
   |HDIS/f|<1.45;
   wherein HDIS represents a value of TV distortion in a horizontal direction of the optical system, f represents an effective focal length of the optical system.

5. The optical system of claim 1, wherein the optical system satisfies the following expression:
   5.00<(|f4|+|f5|)/f<423.00;
   wherein f4 represents an effective focal length of the fourth lens, f5 represents an effective focal length of the fifth lens, and f represents an effective focal length of the optical system.

6. The optical system of claim 1, wherein the optical system satisfies the following expression:
   |SAG71/R72|<0.50;
   wherein SAG71 represents the maximum sagittal height of the object-side surface of the seventh lens in an axis direction of the seventh lens, R72 represents a radius of curvature of the image-side surface of the seventh lens on the optical axis.

7. The optical system of claim 1, wherein the optical system satisfies the following expression:

1.60<(CT1+CT2+CT3)/BFL<2.90;

wherein CT1 represents a thickness of the first lens on the optical axis, CT2 represents a thickness of the second lens on the optical axis, CT3 represents a thickness of the third lens on the optical axis, and BFL represents a minimum distance from the image-side surface of the seventh lens to an image plane in a direction parallel to the optical axis.

8. The optical system of claim 1, wherein the optical system satisfies the following expression:

0.30<(SAG52+SAG61)/(ET5+CT6)<1.20;

wherein SAG52 represents the maximum sagittal height of the image-side surface of the fifth lens in an axis direction of the image-side surface of the fifth lens, SAG61 represents the maximum sagittal height of the object-side surface of the sixth lens in an axis direction of the object-side surface of the sixth lens, ET5 represents a thickness of the fifth lens at the maximum optical clear aperture of the fifth lens, and CT6 represents a thickness of the sixth lens on the optical axis.

9. The optical system of claim 1, wherein the optical system satisfies the following expression:

(f3+|f4|)/(R31+|R41|)<12.00;

wherein f3 represents an effective focal length of the third lens, f4 represents an effective focal length of the fourth lens, R31 represents a radius of curvature of the object-side surface of the third lens on the optical axis, and R41 represents a radius of curvature of the object-side surface of the fourth lens on the optical axis.

10. A lens module, comprising:
a lens barrel; and
an optical system comprising, in order from an object side to an image side along an optical axis:
  a first lens with a positive refractive power, wherein the first lens has an object-side surface and an image-side surface which are both aspherical;
  a second lens with a negative refractive power, wherein the second lens has an object-side surface which is convex near the optical axis, and an image-side surface which is concave near the optical axis;
  a third lens with a positive refractive power, wherein the third lens has an object-side surface which is convex near the optical axis, and an image-side surface which is convex near a periphery of the image-side surface of the third lens;
  a fourth lens with a refractive power, wherein the fourth lens has an object-side surface and an image-side surface which are both aspherical;
  a fifth lens with a refractive power, wherein the fifth lens has an object-side surface and an image-side surface which are both aspherical, and wherein at least one of the object-side surface and the image-side surface of the fifth lens has at least one inflection point;
  a sixth lens with a positive refractive power, wherein the sixth lens has an object-side surface which is convex near the optical axis, both the object-side surface and an image-side surface of the sixth lens are aspherical, and at least one of the object-side surface and the image-side surface of the sixth lens has at least one inflection point; and
  a seventh lens with a negative refractive power, wherein the seventh lens has an object-side surface which is convex near the optical axis, and an image-side surface which is concave near the optical axis, both the object-side surface and the image-side surface of the seventh lens are aspherical, and at least one of the object-side surface and the image-side surface of the seventh lens has at least one inflection point;
wherein the first to seventh lenses of the optical system are received in the lens barrel; and
wherein the optical system satisfies the following expression:

$101.0 \leq FOV \leq 105.0$:

wherein FOV represents the maximum angle of view of the optical system.

11. The lens module of claim 10, wherein the optical system satisfies the following expression:

1.10<TTL/ImgH<1.45;

wherein TTL represents a distance from the object-side surface of the first lens to an image plane on the optical axis, ImgH represents half of a diagonal length of an effective imaging region on the image plane.

12. The lens module of claim 10, wherein the optical system satisfies the following expression:

$19.00 < FOV/TTL \leq 25.00$;

wherein TTL represents a distance from an object-side surface of the first lens to an image plane on the optical axis.

13. The lens module of claim 10, wherein the optical system satisfies the following expression:

|HDIS/f|<1.45;

wherein HDIS represents a value of TV distortion in a horizontal direction of the optical system, f represents an effective focal length of the optical system.

14. The lens module of claim 10, wherein the optical system satisfies the following expression:

5.00<(|f4|+|f5|)/f<423.00;

wherein f4 represents an effective focal length of the fourth lens, f5 represents an effective focal length of the fifth lens, and f represents an effective focal length of the optical system.

15. The lens module of claim 10, wherein the optical system satisfies the following expression:

|SAG71/R72|<0.50;

wherein SAG71 represents the maximum sagittal height of the object-side surface of the seventh lens in an axis direction of the seventh lens, R72 represents a radius of curvature of the image-side surface of the seventh lens on the optical axis.

16. The lens module of claim 10, wherein the optical system satisfies the following expression:

1.60<(CT1+CT2+CT3)/BFL<2.90;

wherein CT1 represents a thickness of the first lens on the optical axis, CT2 represents a thickness of the second lens on the optical axis, CT3 represents a thickness of the third lens on the optical axis, and BFL represents a minimum distance from the image-side surface of the seventh lens to an image plane in a direction parallel to the optical axis.

17. The lens module of claim 10, wherein the optical system satisfies the following expression:

0.30<(SAG52+SAG61)/(ET5+CT6)<1.20;

wherein SAG52 represents the maximum sagittal height of the image-side surface of the fifth lens in an axis direction of the image-side surface of the fifth lens, SAG61 represents the maximum sagittal height of the object-side surface of the sixth lens in an axis direction of the object-side surface of the sixth lens, ET5 represents a thickness of the fifth lens at the maximum optical clear aperture of the fifth lens, and CT6 represents a thickness of the sixth lens on the optical axis.

18. An electronic device, comprising:
a housing;
an electronic photosensitive element; and
the lens module of claim 10;
wherein the lens module and the electronic photosensitive element are received in the housing, and the electronic photosensitive element is disposed on an image plane of the optical system and configured to convert light passing through the first to seventh lenses and incident on the electronic photosensitive element into an electrical signal of an image.

\* \* \* \* \*